United States Patent [19]
Hill et al.

[11] Patent Number: 5,684,972
[45] Date of Patent: Nov. 4, 1997

[54] PROGRAMMABLE SERVO BURST SEQUENCER FOR A DISK DRIVE

[75] Inventors: John P. Hill, Nederland; David L. Dyer; Nicolas C. Assoud, both of Boulder, all of Colo.

[73] Assignee: Adaptec, Inc., Milpitas, Calif.

[21] Appl. No.: 294,234

[22] Filed: Aug. 22, 1994

[51] Int. Cl.[6] .......................... G06F 13/00; G11B 5/596; G05B 19/29
[52] U.S. Cl. .................. 395/404; 360/78.09; 360/78.14; 360/77.08; 360/77.05; 360/77.11; 318/601; 318/560
[58] Field of Search ..................... 395/375, 843, 395/845, 855, 452, 404; 318/403–404, 560, 601; 360/77.08, 77.11, 77.05, 78.09, 78.14

[56] References Cited

U.S. PATENT DOCUMENTS

| | | | |
|---|---|---|---|
| 4,082,944 | 4/1978 | Snider | 371/61 |
| 4,424,543 | 1/1984 | Lewis et al. | |
| 4,509,118 | 4/1985 | Shenk | 364/200 |
| 4,530,019 | 7/1985 | Penniman | |
| 4,663,733 | 5/1987 | Getson, Jr. et al. | 364/900 |
| 4,669,004 | 5/1987 | Moon et al. | |
| 4,823,212 | 4/1989 | Knowles et al. | |
| 4,928,192 | 5/1990 | Bartlett et al. | 360/77.08 |
| 5,243,471 | 9/1993 | Shinn | 360/48 |
| 5,255,136 | 10/1993 | Machado et al. | 360/77.22 |
| 5,315,456 | 5/1994 | Hessing et al. | 360/77.08 |
| 5,345,342 | 9/1994 | Abbott et al. | 360/48 |
| 5,375,020 | 12/1994 | Aggarawal et al. | 360/72.1 |
| 5,381,281 | 1/1995 | Shrinkle et al. | 360/77.08 |
| 5,384,671 | 1/1995 | Fisher | 360/51 |
| 5,412,666 | 5/1995 | Squires et al. | 371/37.4 |
| 5,415,479 | 5/1995 | Kuhn et al. | 400/104 |
| 5,418,659 | 5/1995 | Shergill | 360/51 |
| 5,420,730 | 5/1995 | Moon et al. | 360/77.08 |
| 5,442,498 | 8/1995 | Cheung et al. | 360/77.08 |
| 5,455,721 | 10/1995 | Nemazie et al. | 360/51 |
| 5,477,103 | 12/1995 | Romano et al. | 318/601 |
| 5,487,066 | 1/1996 | McNamara | 370/85.2 |

*Primary Examiner*—Jack B. Harvey
*Assistant Examiner*—Ario Etienne
*Attorney, Agent, or Firm*—Skjerven, Morrill, MacPherson, Franklin & Friel; Forrest E. Gunnison

[57] ABSTRACT

An integrated circuit includes a programmable servo burst sequencer that includes an instruction memory, an instruction register, and an address control circuit. The instruction register drives a plurality of output lines of the programmable servo burst sequencer. The programmable servo burst sequencer can process a plurality of fields in any one of a plurality of servo sectors. The programmable servo burst sequencer eliminates the need for a specific servo burst sequencer for each possible configuration of the plurality of fields in a servo sector. The user simply uses a plurality of instructions to configure the programmable servo burst sequencer so that the programmed servo burst sequencer can process the plurality of fields in the servo sector information on the user's disk drive.

12 Claims, 21 Drawing Sheets

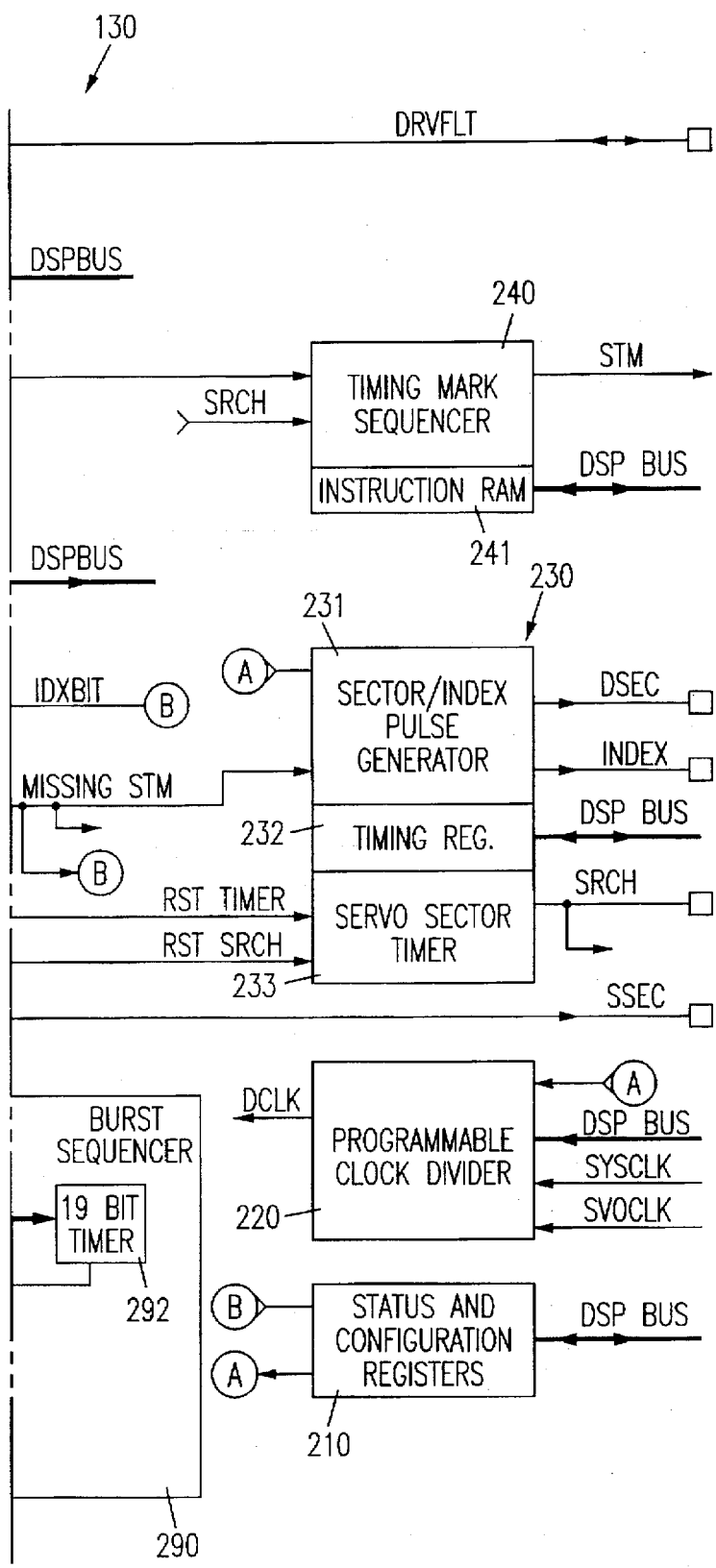
FIG. 2B
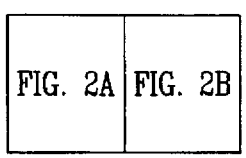
KEY TO FIG. 2

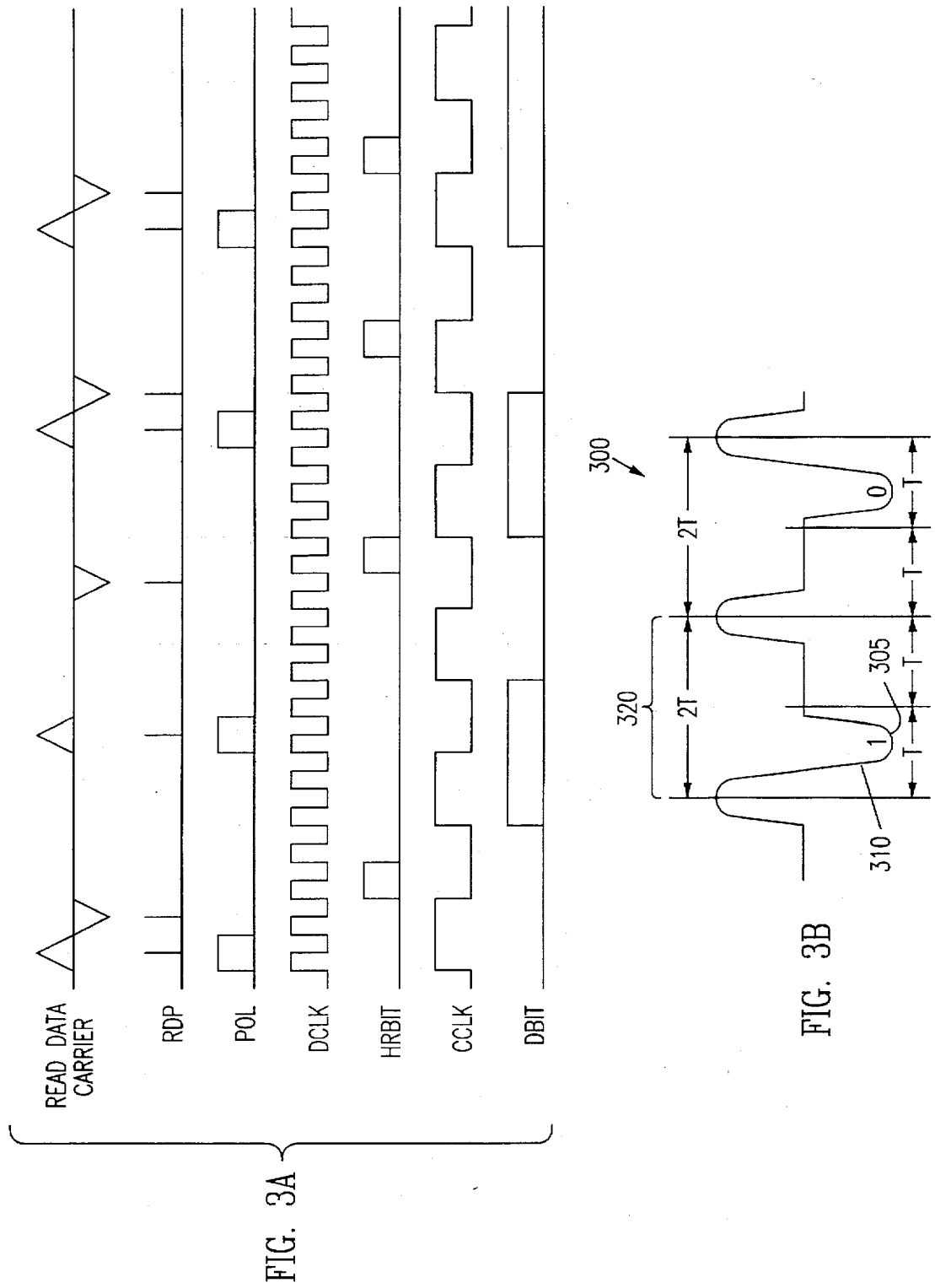

| STM SEQUENCER MAP WORKSHEET | | | | | | | | |
|---|---|---|---|---|---|---|---|---|
| BITS | 19:16 | 15 | 14 | 13 | 12 | 11:10 | 9 | 8 | 7:0 |
| CURRENT SEQ WORD | BRANCH ADDRESS | BRANCH TYPE | SET STM | SYNC FND CLK | SYNC FND BR | COUNTER FUNCTION | WINDOW LD/CNT | SPACE LD/CNT | COUNTER VALUE |
| 0 | 0 | 0 | 0 | 0 | 0 | 00 | 0 | 1 | 14 |
| 1 | 0 | 0 | 0 | 0 | 0 | 11 | 1 | 0 | 04 |
| 2 | 4 | 0 | 0 | 1 | 0 | 10 | 0 | 1 | 0C |
| 3 | 4 | 1 | 0 | 0 | 0 | 00 | 1 | 1 | 0C |
| 4 | 0 | 0 | 0 | 0 | 1 | 11 | 0 | 0 | 04 |
| 5 | 7 | 0 | 0 | 0 | 0 | 10 | 0 | 0 | 00 |
| 6 | 0 | 1 | 0 | 0 | 0 | 00 | 0 | 1 | 14 |
| 7 | 7 | 1 | 1 | 0 | 0 | 00 | 0 | 0 | 00 |
| 8 | | | | | | | | | |
| 9 | | | | | | | | | |
| A | | | | | | | | | |
| B | | | | | | | | | |
| C | | | | | | | | | |
| D | | | | | | | | | |
| E | | | | | | | | | |
| F | | | | | | | | | |

| SEQ ADDR (1001) | 1002A MM I O A D D R | 1003 Reserved | 1002B MM I O A D D R | 1004 Reserved | 1005 Timer & Latch Controls | 1002C MM I O A D D R | 1006 Pin Values (Gates) | 1007 Sequen- cer Signals | 1008 B R T Y P E | 1002D MM I O A D D R / INTERRUPT (1009) | 1010 Branch Address | 1011 Timer Load Value |
|---|---|---|---|---|---|---|---|---|---|---|---|---|
| 00 | E100 | | E101 | | | E102 | | | | E103 | | |
| 01 | E104 | | E105 | | | E106 | | | | E107 | | |
| 02 | E108 | | E109 | | | E10A | | | | E10B | | |
| 03 | E10C | | E10D | | | E10E | | | | E10F | | |
| 04 | E110 | | E111 | | | E112 | | | | E113 | | |
| 05 | E114 | | E115 | | | E116 | | | | E117 | | |
| 06 | E118 | | E119 | | | E11A | | | | E11B | | |
| 07 | E11C | | E11D | | | E11E | | | | E11F | | |
| 08 | E120 | | E121 | | | E122 | | | | E123 | | |
| 09 | E124 | | E125 | | | E126 | | | | E127 | | |

FIG. 10B

KEY TO FIG. 10
| FIG. 10A |
| FIG. 10B |

| | BIT: fedcba9876543210 | BIT: fedcba9876 | BIT: 543210 | BIT: fedcba98 | BIT: 76543 | BIT: 210 | BIT: f | BIT: edcba | 9876543210 |
|---|---|---|---|---|---|---|---|---|---|
| 0A | E128 | E129 | | E12A | | E12B | | | |
| 0B | E12C | E12D | | E12E | | E12F | | | |
| 0C | E130 | E131 | | E132 | | E133 | | | |
| 0D | E134 | E135 | | E136 | | E137 | | | |
| 0E | E138 | E139 | | E13A | | E13B | | | |
| 0F | E13C | E13D | | E13E | | E13F | | | |
| 10 | E140 | E141 | | E142 | | E143 | | | |
| 11 | E144 | E145 | | E146 | | E147 | | | |
| 12 | E148 | E149 | | E14A | | E14B | | | |
| 13 | E14C | E14D | | E14E | | E14F | | | |
| 14 | E150 | E151 | | E152 | | E153 | | | |
| 15 | E154 | E155 | | E156 | | E157 | | | |
| 16 | E158 | E159 | | E15A | | E15B | | | |
| 17 | E15C | E15D | | E15E | | E15F | | | |
| 18 | E160 | E161 | | E162 | | E163 | | | |
| 19 | E164 | E165 | | E166 | | E167 | | | |
| 1A | E168 | E169 | | E16A | | E16B | | | |
| 1B | E16C | E16D | | E16E | | E16F | | | |
| 1C | E170 | E171 | | E172 | | E173 | | | |
| 1D | E174 | E175 | | E176 | | E177 | | | |
| 1E | E178 | E179 | | E17A | | E17B | | | |
| 1F | E17C | E17D | | E17E | | E17F | | | |

↑ 295

| BIT | 37 | 36 | 35 | 34 | 33 | 32 | 31 | 30 | 29 | 28 | 27 | 26 |
|---|---|---|---|---|---|---|---|---|---|---|---|---|
| CUR | MSTM | MSTM | FLG | FLG | SRCH | TMR | | | | | | |
| ADDR | SET | RST | SET | RST | RST | RST | GTA | GTB | GTC | GTD | DISC | SELA |
| 00 | 0 | 0 | 0 | 0 | 0 | 0 | 0 | 0 | 0 | 0 | 0 | 0 |
| 01 | 0 | 0 | 0 | 0 | 0 | 0 | 0 | 0 | 0 | 0 | 0 | 0 |
| 02 | 0 | 0 | 0 | 0 | 0 | 0 | 0 | 0 | 0 | 0 | 1 | 0 |
| 03 | 1 | 0 | 0 | 0 | 1 | 1 | 0 | 0 | 0 | 0 | 1 | 1 |
| 04 | 0 | 0 | 0 | 0 | 0 | 1 | 0 | 0 | 0 | 0 | 0 | 0 |
| 05 | 0 | 0 | 0 | 0 | 0 | 0 | 1 | 0 | 0 | 0 | 1 | 1 |
| 06 | 0 | 0 | 0 | 0 | 0 | 0 | 0 | 1 | 0 | 0 | 1 | 1 |
| 07 | 0 | 0 | 0 | 0 | 0 | 0 | 0 | 0 | 0 | 0 | 0 | 1 |
| 08 | 0 | 0 | 0 | 0 | 0 | 0 | 0 | 0 | 1 | 0 | 0 | 1 |
| 09 | 0 | 0 | 0 | 0 | 0 | 0 | 0 | 0 | 0 | 1 | 0 | 0 |
| 0A | 0 | 0 | 0 | 0 | 0 | 0 | 0 | 0 | 0 | 0 | 0 | 0 |
| 0B | 0 | 0 | 0 | 0 | 0 | 0 | 0 | 0 | 0 | 0 | 0 | 0 |
| 0C | 0 | 0 | 0 | 0 | 0 | 0 | 0 | 0 | 0 | 0 | 0 | 0 |

FIG. 11A

| BIT | 25 | 24 | 23 | 22 | 21 | 20 | 19 | 18:16 | 15 | 14:10 | 9:0 |
|---|---|---|---|---|---|---|---|---|---|---|---|
| CUR ADDR | XSEL2 | EOS XSEL1 | WRT DIS | GRAY SHFT | INDX SHFT | SRVO SCTR | STRT ADC | BR TYPE | DSP INT | BR ADDR | TMR VAL |
| 00 | 0 | 0 | 0 | 0 | 0 | 0 | 0 | 010 | 0 | 02 | OFF |
| 01 | 0 | 0 | 0 | 0 | 0 | 0 | 0 | 111 | 0 | 00 | 000 |
| 02 | 0 | 0 | 1 | 0 | 0 | 0 | 0 | 000 | 0 | XX | 020 |
| 03 | 0 | 0 | 1 | 0 | 0 | 0 | 0 | 011 | 0 | 05 | 1FF |
| 04 | 0 | 0 | 0 | 0 | 0 | 1 | 0 | 111 | 0 | 00 | 000 |
| 05 | 0 | 0 | 1 | 1 | 1 | 1 | 0 | 000 | 0 | XX | 005 |
| 06 | 0 | 0 | 1 | 0 | 0 | 1 | 0 | 000 | 0 | XX | 040 |
| 07 | 0 | 0 | 1 | 0 | 0 | 1 | 0 | 000 | 0 | XX | 00F |
| 08 | 0 | 0 | 1 | 0 | 0 | 1 | 0 | 000 | 0 | XX | 00F |
| 09 | 0 | 0 | 1 | 0 | 0 | 0 | 1 | 000 | 0 | XX | 00F |
| 0A | 0 | 0 | 0 | 0 | 0 | 0 | 0 | 000 | 0 | XX | 00F |
| 0B | 0 | 0 | 0 | 0 | 0 | 0 | 0 | 000 | 0 | XX | 002 |
| 0C | 0 | 0 | 0 | 0 | 0 | 0 | 0 | 111 | 1 | 00 | 000 |

FIG. 11B

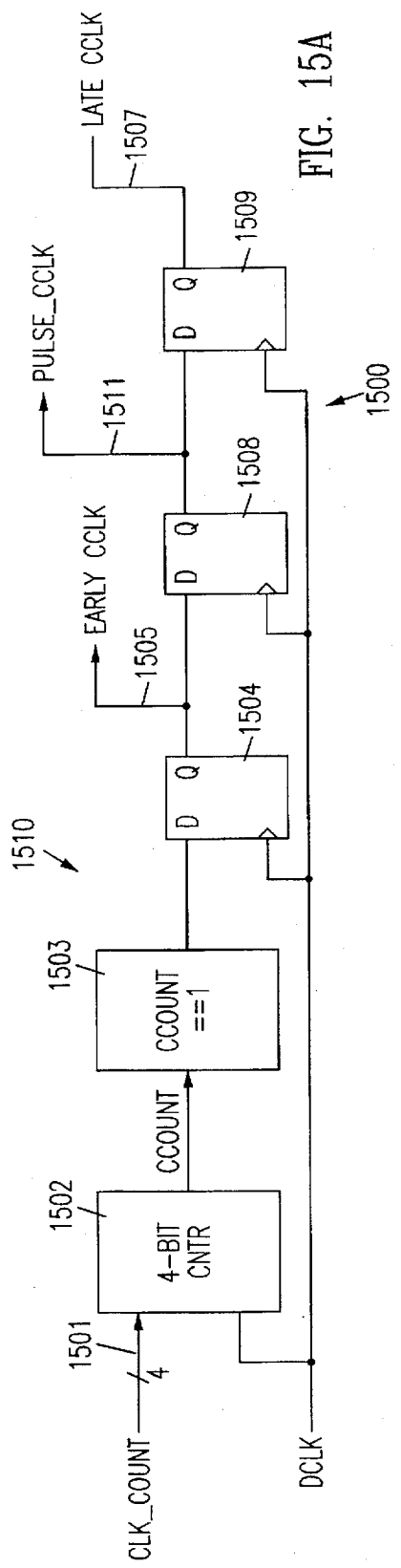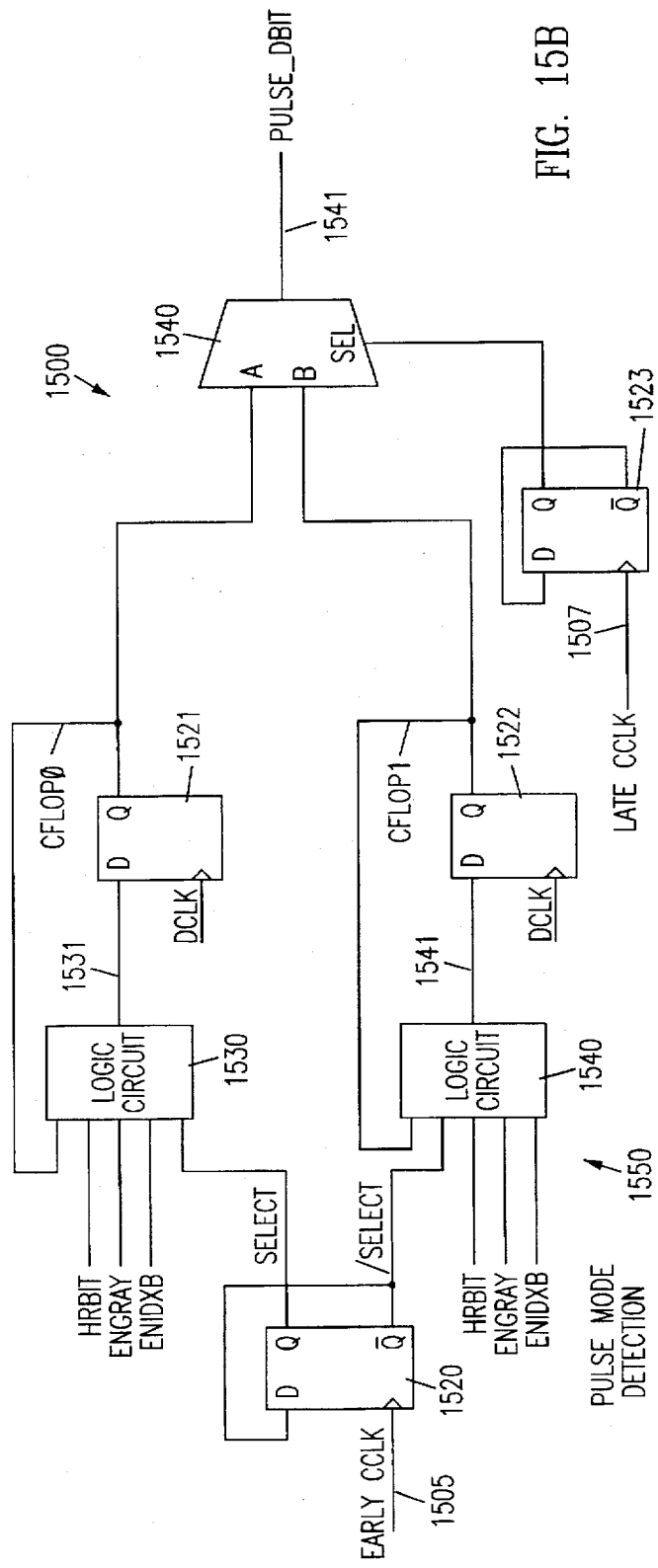
FIG. 15A
FIG. 15B

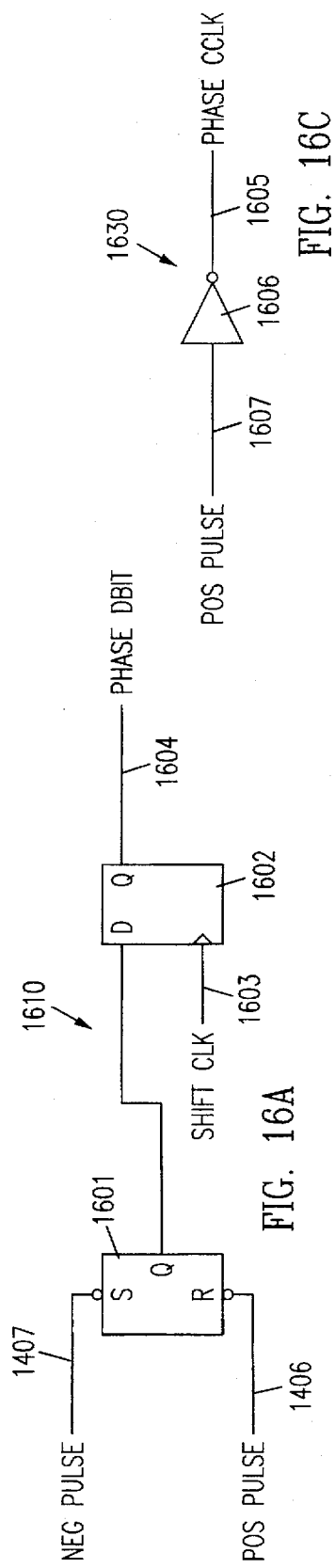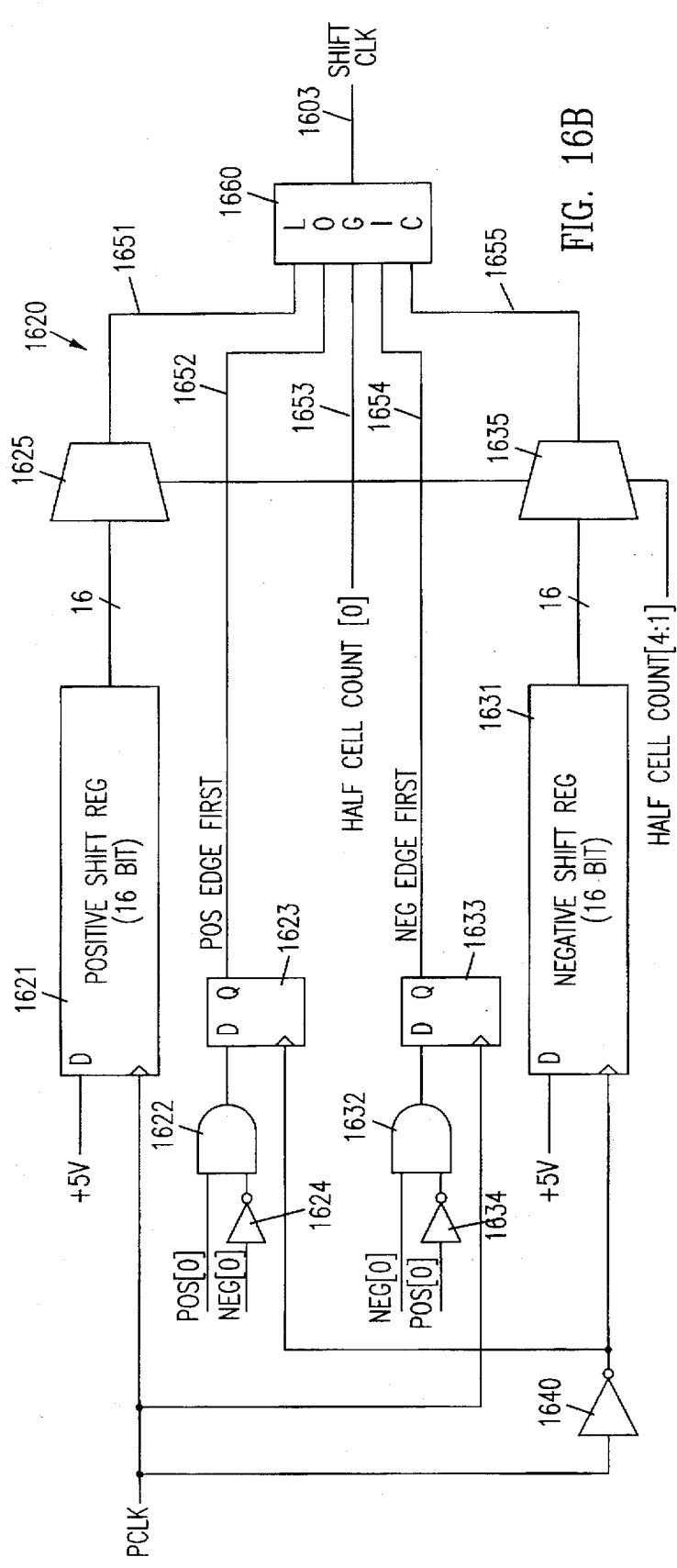
FIG. 16A
FIG. 16B
FIG. 16C

PROGRAMMABLE SERVO BURST SEQUENCER FOR A DISK DRIVE

BACKGROUND OF THE INVENTION

1. Field of the Invention

The present invention relates generally to processing servo burst data in an embedded disk drive servo system and more specifically to a programmable servo burst decoder for processing servo bursts in an embedded disk drive servo system for any combination and order of fields within the servo burst.

2. Description of Related Art

In hard disk drives, an embedded servo system is typically used in positioning a read/write head over a particular field on a particular track on a particular disk. In an embedded servo system, each track on a disk is divided into a multiplicity of data regions by placing a servo sector in front of each data region. The servo sector provides both coarse and fine track following data, automatic gain control data, and synchronization data.

For example, in U.S. Pat. No. 4,823,212 issued to Knowles et al. on Apr. 18, 1989, each track is divided into an equal number of sectors. Each sector includes a section of servo code, referred to as a servo sector, at the beginning of the sector. Each servo sector is the same length and includes, starting at its leading edge, a write splice area, an automatic gain control field, a sector mark field, an index sector identifier, a defect bit, a Gray code track number field, and a track position field followed by another write splice area.

The write splice areas are used to compensate for disk rotational speed variations so that the servo code is not overwritten by data. The automatic gain control field is used to normalize the signals from the read/write head so that subsequent servo fields are properly detected and processed. The sector mark field is used to establish a timing reference for the servo signals that follow. The index sector identifier identifies the first sector on each track, i.e., provides an index pulse. The defect bit is used to indicate that the data sector associated with the servo code is defective. The Gray code track number field is a set of magnetic dibits that contain the track address. As is known to those skilled in the art, the track addresses are addresses that are encoded using a Gray code sequence so that any decoding uncertainty is limited to plus or minus one half track. With the Gray code, only one bit in the track address changes from track to track. Finally, the track position field is used to generate signals that are used for track following.

The various fields within the servo sector of Knowles et al. are typical. The particular arrangement of the fields within the servo sector can vary from disk drive manufacturer to disk drive manufacturer. The variation in the fields requires a unique servo burst processor for each servo sector layout. Developing a servo burst processor for a specific disk drive is expensive. Use of dedicated firmware by the disk drive microprocessor to process the servo burst limits the performance of the disk drive, because while the microprocessor is executing the dedicated servo burst firmware, the microprocessor cannot be used for any other disk drive operation. Consequently, a system is needed that allows easy processing of a wide variety of servo burst patterns, but yet does not require development of a special integrated circuit for each servo sector format. Unfortunately, such a system is not available in the prior art known to the inventors.

Further the configuration of a particular field within a servo sector can vary from disk drive to disk drive. For example, several different approaches have been used in the track position field of the servo sector to encode information that results in accurate track following. For examples of various track position field within a servo sector, see U.S. Pat. No. 4,823,212 issued to Knowles et al. on Apr. 18, 1989; U.S. Pat. No. 4,530,019 issued to Penniman on Jul. 16, 1985; U.S. Pat. No. 4,424,543 issued to Lewis et al. on Jan. 3, 1984; and U.S. Pat. No. 4,669,004 issued to Moon et al. on May 26, 1987, each of which are incorporated herein by reference in its entirety. To the extent that the track position fields in each of these references are different, each would require a different servo burst processor. This means that implementing a particular track position field would also require development of a specific servo burst processor that could process the particular information in the field. This further demonstrates the need for a system that can process any one of a number of servo sector formats as well as variations within a given format.

SUMMARY OF THE INVENTION

In accordance with the principles of this invention, an integrated circuit includes a programmable servo burst sequencer that is sometimes called a servo burst sequencer. The servo burst sequencer includes an instruction memory, an instruction register, and an address control circuit. The instruction register drives a plurality of output lines of the programmable servo burst sequencer.

The programmable servo burst sequencer of this invention can process a plurality of fields in any one of a plurality of servo sectors. The programmable servo burst sequencer eliminates the need for a specific servo burst sequencer for each possible configuration of the plurality of fields in a servo sector. According to the principles of this invention, the user simply uses a plurality of instructions to configure the programmable servo burst sequencer so that the programmed servo burst sequencer can process the plurality of fields in the servo sector information on the user's disk drive.

The programmable servo burst sequencer of this invention provides a new level in servo sector field processing. First, a single integrated circuit can now be used in any number of disk drives where each disk drive has a different servo sector field format. This reduces the cost of the disk drive, while allowing the disk drive manufacturer to optimize the servo sector fields for the manufacturer's particular application.

Second, the programmable servo burst sequencer off loads work from the disk drive processor, either the microprocessor or the DSP so that the servo burst is decoded in parallel with the DSP performing other operations.

In one embodiment, the servo burst sequencer of this invention in initially in an idle loop looking for an active signal on a search input line. When the signal on the search input line goes active, the burst sequencer sometimes referred to as the servo burst sequencer, starts looking for an active signal on a servo timing mark input line within a predetermined period. In response to a signal on the servo timing mark input line to the burst sequencer, burst sequencer executes instructions in an instruction memory to analyze the remainder of the servo burst.

For example, the burst sequencer generates an active reset search signal on one of the plurality of burst sequencer output lines to reset the search signal. On a servo sector output line in the plurality of output lines, the burst sequencer generates an active servo sector signal and later drives the servo sector signal inactive. The burst sequencer also can generate an active signal on a write gate disable output line to a write gate control circuit to disable generation of a write gate signal. The burst sequencer generates an active signal on a shift enable output line to enable processing of Gray code in the servo burst and generates actives signals on a plurality of output lines to control operations of a read channel integrated circuit.

Hence, the programmable burst sequencer of this invention has an input line to receive a servo timing mark signal, and a plurality of output lines. The programmable burst sequencer is programmably configurable to process a portion of a servo burst upon receiving an active signal on the servo timing mark input line.

In one embodiment, the programmable servo burst sequencer has a branch control logic circuit with a plurality of input lines. The plurality of branch control logic circuit input lines includes the servo timing mark input line, a missing servo timing mark input line, and a search input line. The branch control logic circuit provides control signals to an address control logic circuit.

The address control logic circuit has a plurality of sets of address input lines. One set of address input lines in the plurality of sets is a branch address bus. Another set of address input lines in the plurality of sets are current address lines that carry an address of an instruction in an instruction register. Yet another set of address input lines in the plurality of sets are current address plus one lines that carry the address of the instruction in the instruction register plus one. The address control logic circuit selects the address on one set of input lines based on the control signals from the branch control logic circuit and drives that address on the output address bus to an instruction memory. Thus, the address control logic circuit and the branch control logic circuit are an address generating circuit.

Instructions loaded in the instruction memory control operation of the programmable servo burst sequencer. In one embodiment, the instruction memory is 38 bits wide and 32 instructions deep. The six most significant bits of each instruction are stored in a timer and latch control region that is a six-bit wide column. The most significant eight bits of the second 16-bit word of each instruction are stored in a pin values region that is an eight-bit wide column. The next five bits of the second word of each instruction are stored in a sequencer signals region, that is a five-bit wide column, and the three least significant bits of the second word are stored in a branch type region, that is a three-bit wide column. The most significant bit of the first 16-bit word is stored in an interrupt region that is a one-bit column and the next five bits are stored in a branch address region that is a five-bit wide column. The ten least significant bits of the instruction are stored in a timer load value region that is a ten-bit wide column.

The instruction in the location in the instruction memory pointed to by the address on the output address bus is loaded into an instruction register that is sometimes called an instruction decoder. The instruction register has a plurality of output lines, that are the output lines of the servo burst sequencer, and has the same width as the instruction memory. In one embodiment, the instruction decoder generates a plurality of signals that either control, enable, or provide data for operation of a gray code shift register, an index bit latch, a missing STM latch, a servo timing control circuit, a write gate control circuit as well as signals to pins of the integrated circuit containing the programmable servo burst sequencer.

The plurality of instruction register output lines includes the branch address bus that is connected to the address control logic circuit, a branch type bus that is connected to the branch control logic circuit, and a count value bus that is connected to a timer circuit. The timer circuit has an output line connected to one of the plurality of input lines to the branch logic circuit. When the timer circuit times out, the branch logic circuit generates control signals to the address control circuit to select either the current address, the current address plus one, or the branch address depending on the conditions specified by the current instruction in the instruction register.

According to the method of this invention, a portion of a servo sector is processed by a servo burst sequencer by generating an address for an instruction in a memory of the servo burst sequencer and loading the addressed instruction into an instruction register. A timer load value field of the instruction is loaded into a state timer when execution of the instruction begins. The loaded instruction specifies operations that are performed based on a plurality of input signals. In particular, a branch type field in the instruction specifies the conditions under which execution transfers to the branch address specified in the instruction. In one embodiment, the branch type field is three bits in size and the definition of the various configurations of the branch type field are:

| Branch Type | Name | Branch Condition |
| --- | --- | --- |
| 000 | Never Branch. | Always execute the next sequential instruction when a state timer times out. |
| 001 | Missing STM. | Branch if a missing STM latch is set, and otherwise go to next sequential instruction when the state timer times out. |
| 010 | SRCH. | Branch if an input search signal is active, and otherwise go the next sequential instruction when the state timer times out. |
| 011 | STM and SRCH. | Branch if a servo timing mark input signal is detected and the input search signal is active, and otherwise go the next sequential instruction when the state timer times out. |
| 100 | Flag. | Branch if a flag bit in a decoder status register is set, and otherwise go the next sequential instruction when the state timer times out. |
| 101 | Branch Bit. | Branch if the branch bit is set in a decoder control register, and otherwise go the next sequential instruction when the state timer times out. |
| 110 | Branch Bit Timed. | Branch when the state timer has a zero value if the branch bit is set in the decoder control register, and otherwise go the next sequential instruction when the state timer times out. |
| 111 | Unconditional Branch | Always branch immediately. |

The flexibility of the branching conditions in conjunction with the other output signals generated by the instruction register permits the servo burst sequencer of this invention to be used to process a wide variety of servo bursts.

BRIEF DESCRIPTION OF THE DRAWINGS

FIG. 3A is a signal timing diagram illustrating the operation of the data synchronizer of this invention in mode 0.

FIG. 3B is a signal trace illustrating prior art phase signal encoding.

FIG. 9 is one embodiment of a set of instructions for the programmable timing mark sequencer of this invention.

FIG. 10 is a memory map for one embodiment of the instruction RAM in the programmable burst sequencer of this invention.

FIGS. 11A and 11B is one embodiment of a set of instructions for the programmable burst sequencer of this invention.

FIG. 15A is a more detailed diagram of one embodiment of a cell clock generation circuit of the data synchronizer of this invention that is used in the pulse mode of operation.

FIG. 15B to 15D are more detailed diagrams of one embodiment of a data bit generation circuit of the data synchronizer of this invention that is used in the pulse mode of operation.

FIGS. 16A and 16B are more detailed diagrams of one embodiment of a data bit generation circuit of the data synchronizer of this invention that is used in the phase mode of operation that include a novel shift clock circuit.

FIG. 16C is a more detailed diagram of one embodiment of a cell clock generation circuit of the data synchronizer of this invention that is used in the phase mode of operation.

DETAILED DESCRIPTION

According to the principles of this invention, a disk drive controller integrated circuit includes a programmable servo burst decoder that can process any one of a plurality of servo sectors. The programmable servo burst decoder eliminates the need for a specific servo burst decoder for each possible configuration of a servo sector. According to the principles of this invention, the user simply uses a plurality of instructions to configure the programmable servo burst decoder of this invention so that the programmed servo burst decoder can process the servo sector information on the user's disk drive.

The programmable servo burst decoder of this invention provides a new level in servo sector processing. First, a single integrated circuit can now be used in any number of disk drives where each disk drive has a different servo sector format. This reduces the cost of the disk drive, while allowing the disk drive manufacturer to optimize the servo sector for the manufacturer's particular application.

Second, the programmable servo burst decoder off loads work from the disk drive processor, either the microprocessor or the DSP, so that the servo burst is decoded in parallel with the DSP performing other operations. The track following capability of a disk drive is a function of how fast a command to the actuator can be generated after the embedded servo sector position information is available. In addition to processing the servo burst, the processor may be required to perform other functions such as loading registers with data sector timing information or calculating track and sector specific information such as offset and external disturbance compensation. Additionally, the servo sector needs to be as small as possible to maximize the disk area available for data storage. This means that the time available to perform the various operations during the servo burst is decreased to the extent possible. Consequently, the parallel operation of programmable servo burst decoder of this invention and the processor maximizes the use of the servo burst period for all of these operations.

Also, the resolution of field boundaries in the servo sector is not limited by the instruction execution speed of the processor. The programmable servo burst decoder of this invention can operate at a speed higher than the instruction execution speed of the processor and so obtain a higher resolution of the servo sector field boundaries.

Figure 1:
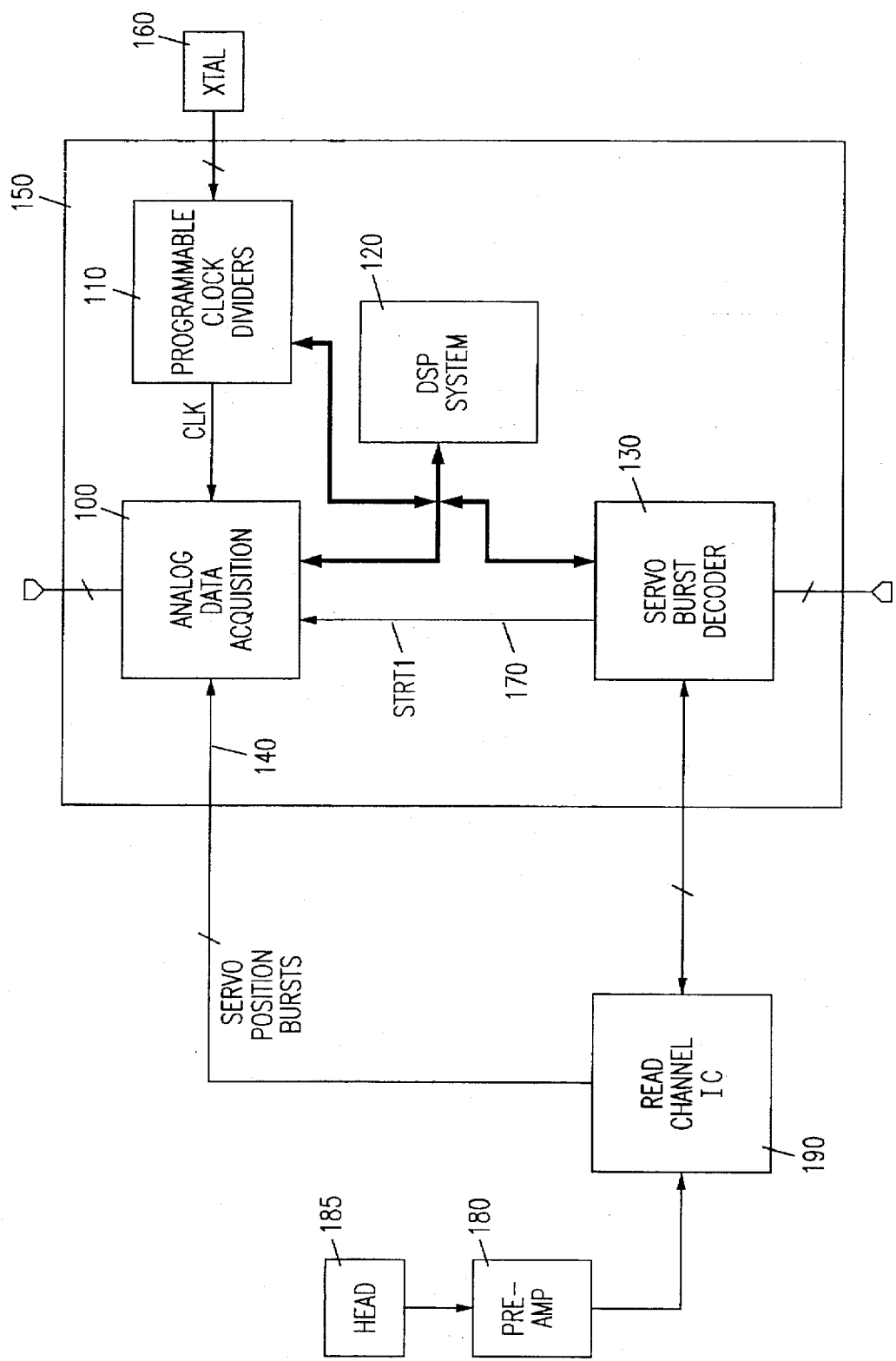
FIG. 1 is a block diagram of an integrated circuit containing the programmable servo burst decoder of this invention.

In one embodiment, programmable servo burst decoder 130 (FIG. 1) of this invention is included in an integrated circuit 150 that also includes: a programmable clock divider circuit 110 that is driven by an external crystal 160; a digital signal processor (DSP) system 120 that includes a DSP core, random access memory (RAM), read-only memory (ROM), timers, and an interrupt controller; and an analog data acquisition system 100. DSP system 120 is sometimes referred to as DSP 120.

The particular configuration of the elements included within integrated circuit 150 are not critical to this invention so long as the elements provide the signals to programmable servo burst decoder 130 and can process the signals from programmable servo burst decoder 130, that are described more completely below. One embodiment of an analog data acquisition system 100 suitable for use in this invention is described in copending, commonly filed, and commonly assigned, U.S patent application Ser. No. 08/293,973 entitled "An Analog Data Acquisition System" of John P.

Hill filed on Aug. 22, 1994, which is incorporated herein by reference in its entirety.

As explained more completely below, programmable servo burst decoder 130 is fully programmable and can be programmed to match a specific servo sector and track format. Programmable servo burst decoder 130 can be configured to process any order, length, number and composition of servo sectors on a disk. In addition support for read channel integrated circuit 190 is also programmable. Therefore, unlike the prior art disk controllers, a disk controller including programmable servo burst decoder 130 can be used for a wide variety of embedded servo systems and so a separate servo burst processor for each embedded servo sector format is no longer required.

In this embodiment, disk drive head 185 reads each embedded servo sector on the disk and provides an analog signal, a servo burst, representing the servo sector to preamp 180. Preamp 180 provides an amplified analog signal to a read channel integrated circuit 190. One read channel integrated circuit 190 suitable for use with this invention is sold by IMP, 2830 North First Street, San Jose, Calif. 95134 as integrated circuit part number IMP62C538-40. Another read channel integrated circuit 190 suitable for use with this invention is sold by VTC Inc., 2800 East Old Shakopee Road, Bloomington, Minn. 55425-1350 as integrated circuit part number VM7401. In response to gating signals from programmable servo burst decoder 130, read channel integrated circuit 190 captures and holds the peak amplitude of each position burst in the servo sector. Typically, four analog servo position bursts are provided on lines 140 to analog data acquisition system 100 by read channel integrated circuit 190.

Prior to the start of the processing of the data in each servo sector, the disk drive is spun up and once at speed, DSP 120 configures a timing mark sequencer within programmable servo burst decoder 130 to look for timing marks. When the timing mark sequencer detects the timing marks, DSP 120 switches programmable servo burst decoder 130 to automatic operation that is described more completely below.

Briefly, in automatic operation, programmable servo burst decoder 130 starts a timer that times from a previous servo sector to the middle of the automatic gain control field at the start of the next servo sector. When the timer expires, programmable servo burst decoder 130 begins the search for a timing mark and processing of the servo burst. When the timing mark is detected the timer is restarted and the process repeats itself.

Figure 2A:
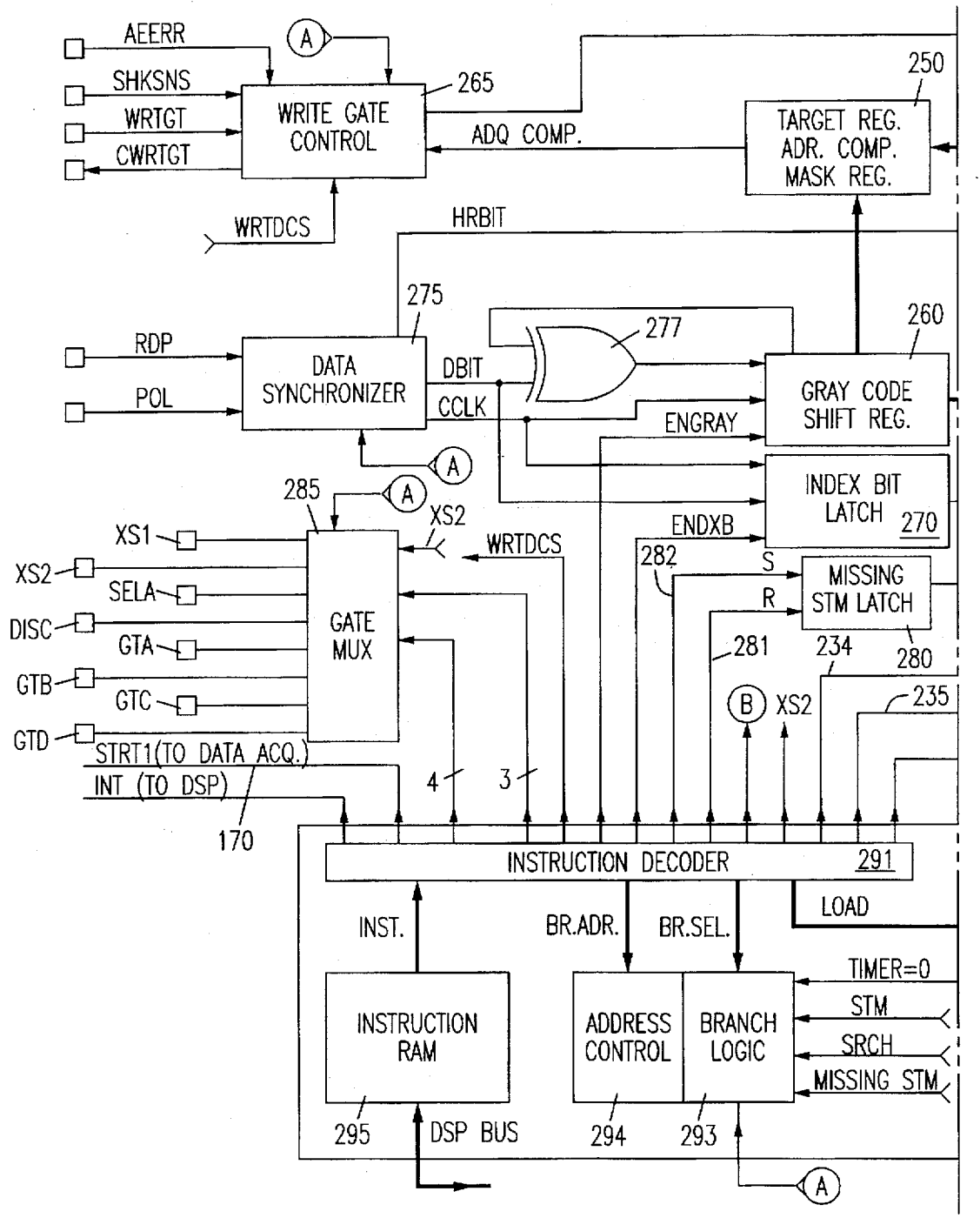
FIG. 2 is a block diagram of the servo burst decoder of this invention.

The novel programmable servo burst decoder 130 of this invention is shown in more detail in FIG. 2. In this embodiment, DSP 120 loads instructions in burst sequencer 290 and timing mark sequencer 240 for processing the servo bursts. DSP 120 also sets bits in the configuration registers within status and configuration registers 210 to control the operation of programmable servo burst decoder 130. Similarly, DSP 120 configures programmable clock divider circuit 220 to use one of the system clock and a clock from a pin of the integrated circuit and to divide the selected clock signal to obtain decode clock DCLK that is used by timing mark sequencer 240, burst sequencer 290, and data synchronizer 275 for timing.

Servo timing control circuit 230, that includes sector/index pulse generator circuit 231, timing registers 232 and servo sector timer 233, drives a search signal SRCH active at approximately the start of each servo burst. Upon receiving the active search signal SRCH, timing mark sequencer 240 automatically analyzes a sequence of high resolution data bits HRBIT from data synchronizer 275. If the appropriate timing pattern is detected in the sequence of high resolution data bits HRBIT, timing mark sequencer 240 drives servo timing mark signal STM active.

In response to the active timing mark signal STM, burst sequencer 290 executes the instructions for analyzing the remainder of the servo burst. Typically, burst sequencer 290 resets signal SRCH, generates an active servo sector signal SSEC, and disables write gate control circuit 265. Burst sequencer 290 enables processing of any Gray code in the servo burst as well as capture of track following data by analog data acquisition system 100.

In this embodiment, read channel integrated circuit 190 provides data synchronizer 275 a qualified read data pulse RDP that occurs at the peaks of the read data carrier and a polarity signal POL that specifies the polarity of read data pulse RDP. The active signal levels for read data pulse RDP and polarity signal POL are defined by bits of a register in status and configuration registers 210 that are configured by information transmitted by DSP 120 over the DSP bus, as described more completely below.

In this embodiment, data synchronizer 275 can operate in two modes, i.e., a pulse detection mode that is referred to as mode 0, and a phase detection mode that is referred to as mode 1. More detailed schematic diagrams for the pulse detection mode and the phase detection mode of data synchronizer 275 are presented in FIGS. 14, 15A to 15D and 16A to 16C, that are discussed more completely below.

In mode 0, the signals on line HRBIT can be defined in terms of a positive pulse, a negative pulse, or a combination of positive and negative pulses on line RDP by bits of a register in status and configuration registers 210 that are configured by information transmitted by DSP 120 over DSP bus, as described more completely below. Herein, for convenience, the same reference numeral is used for a signal, the bus or line carrying that signal, and a pin that receives or provides the signal. Also, elements with the same reference numeral are the same.

In FIG. 3A, the read data carrier signal and the resulting read data pulse signal RDP and polarity signal POL are illustrated. Data synchronizer 275 is configured in this embodiment so that pulses on line RDP representing negative read data carrier pulses are used to generate a high resolution data bit on line HRBIT that is used by timing mark sequencer 240. Decode clock DCLK is generated by programmable clock divider circuit 220, that is described more completely below. In mode 0, decode clock DCLK is used for timing in data synchronizer 275. Specifically, the cell time, which is the cell period, for the signal on line DBIT is set in programmable clock divider circuit 220 to four clock periods of decode clock DCLK by configuring a 16-bit counter.

For mode 1 operation of data synchronizer 275, the read data carrier signal, in this embodiment, is generated by a self-clocked phase encoded signal 300 (FIG. 3B) where the polarity of the signal is determined by whether peak 305 of negative going pulse 310 occurs in the first half or the second half of cell 320 which has a width of 2T. In mode 1, data synchronizer 275 uses positive pulses, negative pulses or a combination of positive and negative pulses on line RDP depending on which pulses enabled by bits of a register in status and configuration registers 210 that are configured by information transmitted by DSP 120 over DSP bus, as described more completely below.

Figure 3C:
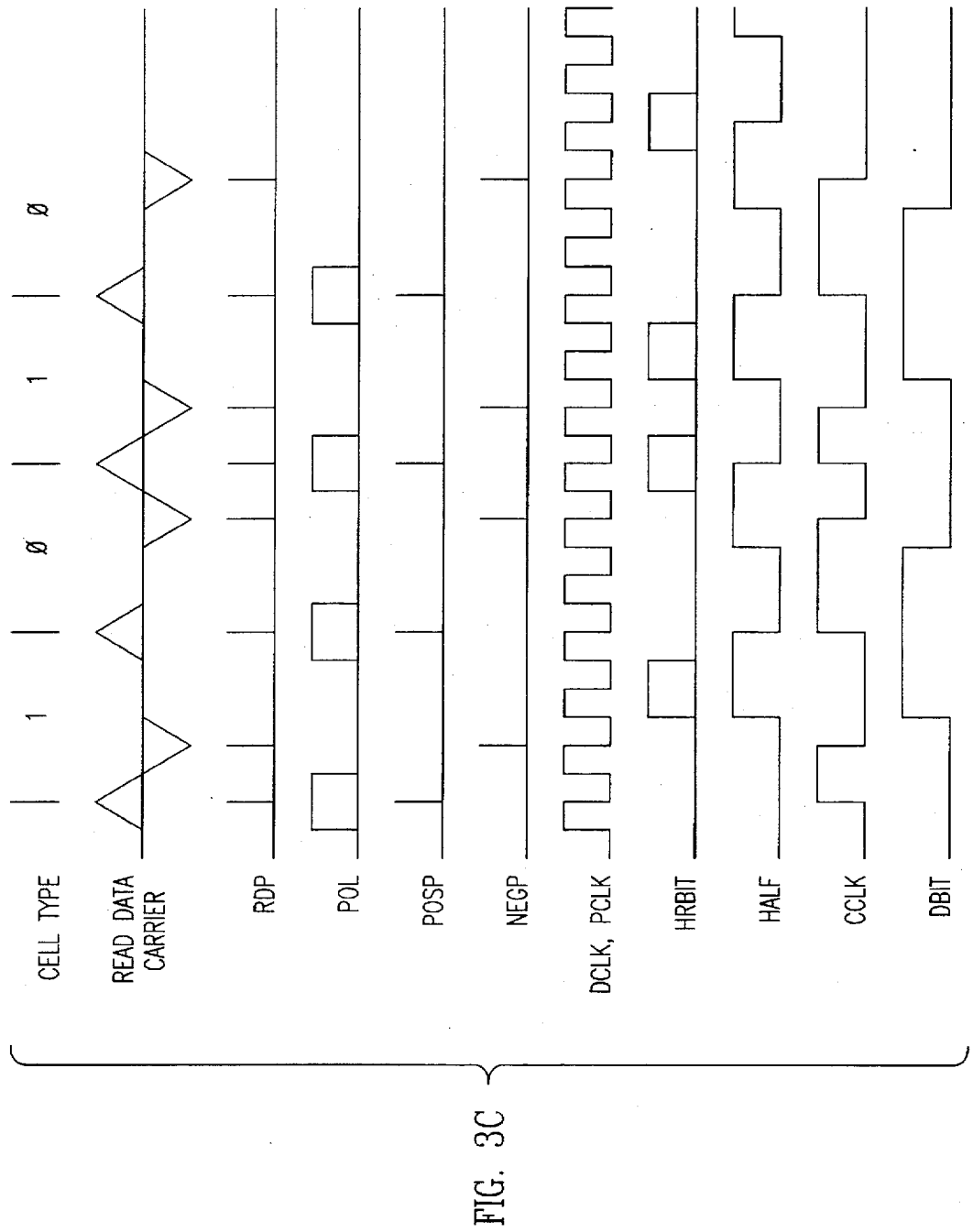
FIG. 3C is a signal timing diagram illustrating the operation of the data synchronizer of this invention in mode 1.

In FIG. 3C, positive pulse signal POSP, negative pulse signal NEGP, code clock signal CCLK are all generated based on the signals on lines RDP and POL. Specifically, cell clock signal CCLK is set by pulse POSP as determined from signals RDP and POL and reset by negative pulse NEGP as determined from signals RDP and POL.

The state of data signal DBIT is determined by the phase, i.e., location, of negative pulse NEGP within the period, sometimes called a bit cell or simply cell, of cell clock signal CCLK. Specifically, if negative pulse NEGP occurs in the first half of the period of cell clock signal CCLK, data signal DBIT is one. Conversely, if negative pulse NEGP occurs in the second half of the period of cell clock signal CCLK, data signal DBIT is zero. In mode 1, high resolution data bit HRBIT is typically not used.

The location of the half period boundary of cell clock signal CCLK, i.e., when signal HALF goes active, is timed from positive pulse POSP using clock PCLK. The number of half-cycles of clock PCLK to the half period is programmable using a field, bits 10 to 14, within decoder control register DECCTL (See Table 20.) within status and configuration registers 210. The source for clock PCLK is either a servo clock pin SVOCLK, or system clock SYSCLK as specified in a first clock configuration register in status and configuration registers 210. The counter that defines the half period of cell clock CCLK counts both edges of clock PCLK for increased resolution. In general, clock PCLK is preferably the highest frequency clock available. Decode clock DCLK and clock PCLK might have the same source, but decode clock DCLK could be divided.

In this embodiment, the mode definition and consequently data bit DBIT definition for data synchronizer 275 can be changed as a function of the fields within the servo sector, i.e, between the timing mark field and the gray code field. Specifically, in this embodiment, the two most significant bits in decoder configuration register DECCFG (See Table 18.) select the mode of operation in terms of the state of servo sector signal SSEC. The state of bit 15, the most significant bit, controls the mode of operation of data synchronizer 275 when servo sector signal SSEC is active. The state of bit 14, the next to most significant bit, controls the mode of operation of data synchronizer 275 when servo sector signal SSEC is inactive.

Data synchronizer 275 in mode 0 as well as the other circuits in programmable servo burst decoder 130 are timed by decode clock DCLK. Decode clock DCLK is generated by programmable clock divider circuit 220 that allows operation at the frequency of system clock SYSCLK, or at a lower frequency for power savings or format considerations. In this embodiment, programmable clock divider circuit 220 can divide the input clock signal by 1 to 16. A clock signal on servo clock pin SVOCLK can be selected as the input signal to programmable clock divider circuit 220 rather than system clock SYSCLK. This allows the optimization of both the DSP cycle time and the rate of programmable servo burst decoder 130.

Data synchronizer 275 has two output paths, one to timing mark sequencer 240 and a second to both gray code shift register 260 and index bit latch 270. Specifically, high resolution data bit signal HRBIT is provided to timing mark sequencer 240 while data signal DBIT is provided to a first input terminal of exclusive OR gate 277 and to a data input terminal of index bit latch 270. As explained more completely below, an EXOR disable bit, bit 1, in decoder status register DECSTA (Table 22) in status and configuration registers 210 can be set so that data signal DBIT is provided directly to gray code shift register 260. A second input terminal of exclusive OR gate 277 is connected to an output line of gray code shift register 260 and an output terminal of exclusive OR gate 277 is connected to a data input terminal of gray code shift register 260. Cell clock output signal CCLK of data synchronizer 275 drives another input line of gray code shift register 260 and a second input line of index bit latch 270.

Servo sector timer 233 within servo timing control circuit 230 is configured by DSP 120 to measure the period between servo sectors, which in this embodiment is approximately the time between servo timing marks. Specifically, the time is somewhat less that the time between servo timing marks because the search for the next timing mark is started in the automatic gain control field before the next timing mark.

Figure 4:
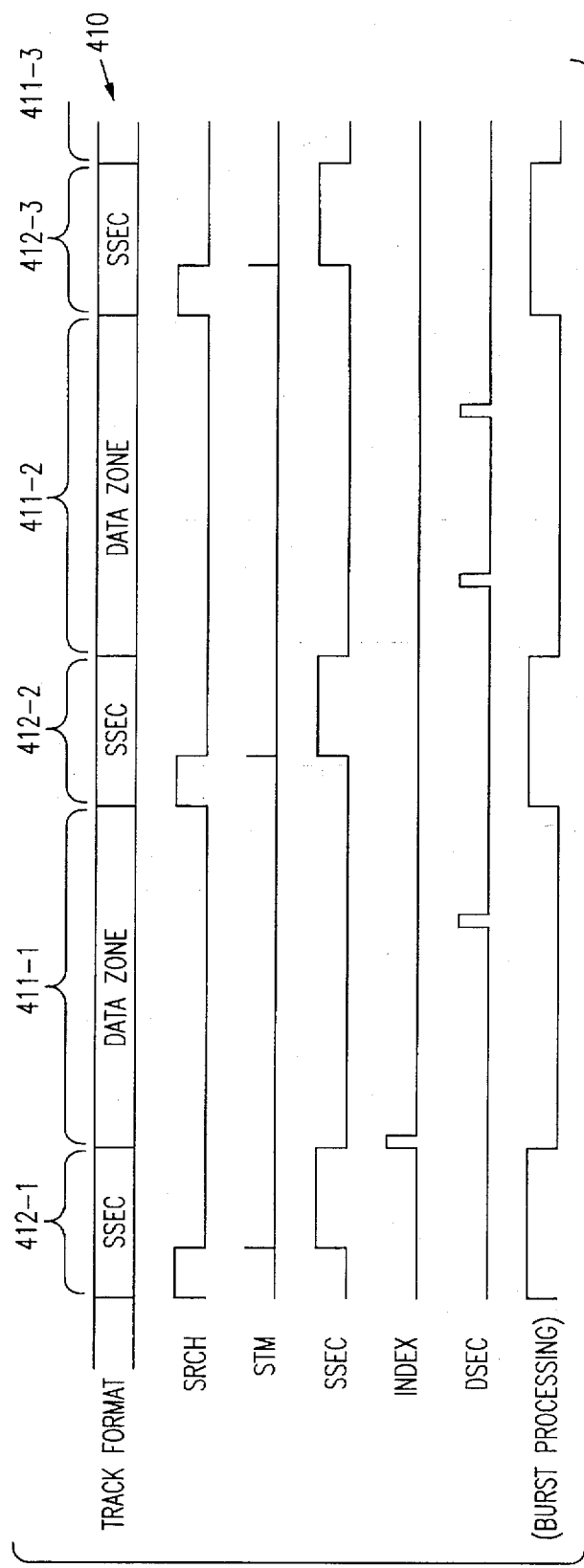
FIG. 4 is a timing diagram illustrating the sequencing of signals generated by the programmable servo burst decoder in one embodiment.

A search window time register 1903 (FIG. 19) within timing registers 232 (FIG. 2) is loaded with a time delay after the last reset of servo sector timer 233 to initiate a search for the next servo timing mark. The output signal of servo sector timer 233 is compared by a comparator with the time delay in the search window time register 1903 and when the two are equal, which occurs in the gap before the next expected servo sector, search signal SRCH is driven active. (FIG. 4).

Signal SRCH from servo timing control circuit 230 initiates processing by timing mark sequencer 240 and burst sequencer 290, and sets a bit in status and configuration registers 210. Note that in FIG. 4, a portion of a track 410 is represented by TRACK FORMAT where each data zone 411-1, 411-2, 411-3 is preceded by a servo sector 412-1, 412-2, 412-3. Search signal SRCH is driven active at the start of each servo sector.

Since both servo sector timer 233 and the value in search window register 1903 are programmable, the initiation of search signal SRCH can be configured for any desired track layout, e.g., programmable servo burst decoder 130 is easily configured to initiate servo sector processing for a disk that has 19 servo sectors per track, a disk that has 72 servo sectors per track, or any other number of servo sectors per track. In addition, the time search signal SRCH which remains active is also programmable so that different synchronization configurations within a servo sector are also easily accommodated.

Prior to search signal SRCH going active, burst sequencer 290 is in an idle loop looking for signal SRCH to go active. When signal SRCH goes active (FIG. 4), timing mark sequencer 240 (FIG. 2) is started and burst sequencer 290 starts looking for a servo timing mark STM from timing mark sequencer 240 within a predetermined period.

Figure 5:
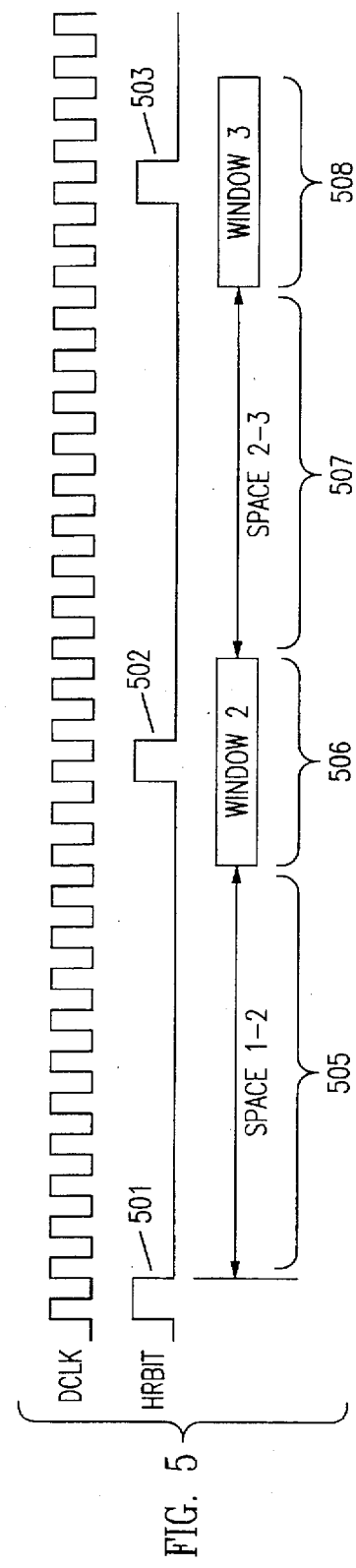
FIG. 5 is a diagram illustrating the principles of operation of the programmable timing mark sequencer of this invention.

According to the principles of this invention, a servo timing mark field in a servo sector is characterized as one or more spaces, in which there should be no data bits, separated by windows in which a data bit should be found. FIG. 5 is an example of a 2 of 3 timing mark in which first bit 501 and either of second bit 502 or third bit 503 on line HRBIT must be detected for a valid timing mark. As explained more completely below, upon detection of bit 501, timing mark sequencer 240 loads a space timer with a first time period 505 between first bit 501 and the earliest time that second bit 502 is expected and enables the space timer so that each subsequent rising edge of decode clock DCLK decrements the counter.

When the space timer times out, a window timer is enabled so that each subsequent rising edge of decode clock DCLK decrements the window timer. The window timer was loaded with a window 506 in which second bit 502 is expected. If bit 502 is detected in window 506, timing mark sequencer 240 records the event. When the window timer times out, the space timer, which has been loaded with a second time period 507 between the end of second window 506 and the earliest time that third bit 503 is expected, is enabled so that each subsequent rising edge of decode clock DCLK decrements the space timer.

When the space timer times out, the window timer again is enabled so that each subsequent rising edge on decode clock DCLK decrements the window timer. The window timer was loaded with a second window 508 in which third bit 503 is expected. If either bit 502 or bit 503 is detected, programmable timing mark sequencer 240 generates servo timing mark STM (FIG. 4) when the window timer times out.

Timing mark sequencer 240 is a fully programmable sequencer that is optimized for the detection of servo sector timing mark patterns. In this embodiment, timing mark sequencer 240 includes a branch and fetch unit 601, a timing mark sequencer random access memory (RAM) 241, an instruction register 603, a space counter 604, a window counter 605 and a synchronization found flip-flop 606. As explained above, timing mark sequencer 240 receives a plurality of input signals, a search signal SRCH, a high resolution data bit signal HRBIT, and a decode clock signal DCLK, and generates a servo timing mark output signal STM.

Upon power-up, the instructions executed by timing mark sequencer 240 are loaded over the DSP data bus into sequencer RAM 241, which in this embodiment is static RAM that is sixteen instructions deep. In this embodiment, as explained more completely below, the instructions are twenty bits wide and the DSP data bus DATA <16:0> to sequencer RAM 241 is 17 bits wide. Thus, two writes are required to load each instruction into sequencer RAM 241. Specifically, the signal on chip select line CHIP_SELECT is driven active; the least significant five bits on DSP address bus ADDRESS <4:0> specify a valid sequencer RAM address; and the signal on write line WRITE is driven active. Bit 0 of DSP address bus ADDRESS specifies whether the write is to a full 16-bit word (bit 0 =0) or to a 4-bit word (bit 0 =1). Address bits [4:1] specify which of the 16 sequencer instructions is to be written by DSP 120.

Thus, the least significant 16-bits of an instruction are written to sequencer RAM 241 as a 16-bit word. The sequencer RAM address is incremented and a second 4-bit word is written to sequencer RAM 241 where bits 0 to 3 to the second word are bits 16 to 19 of the instruction.

Figure 7:
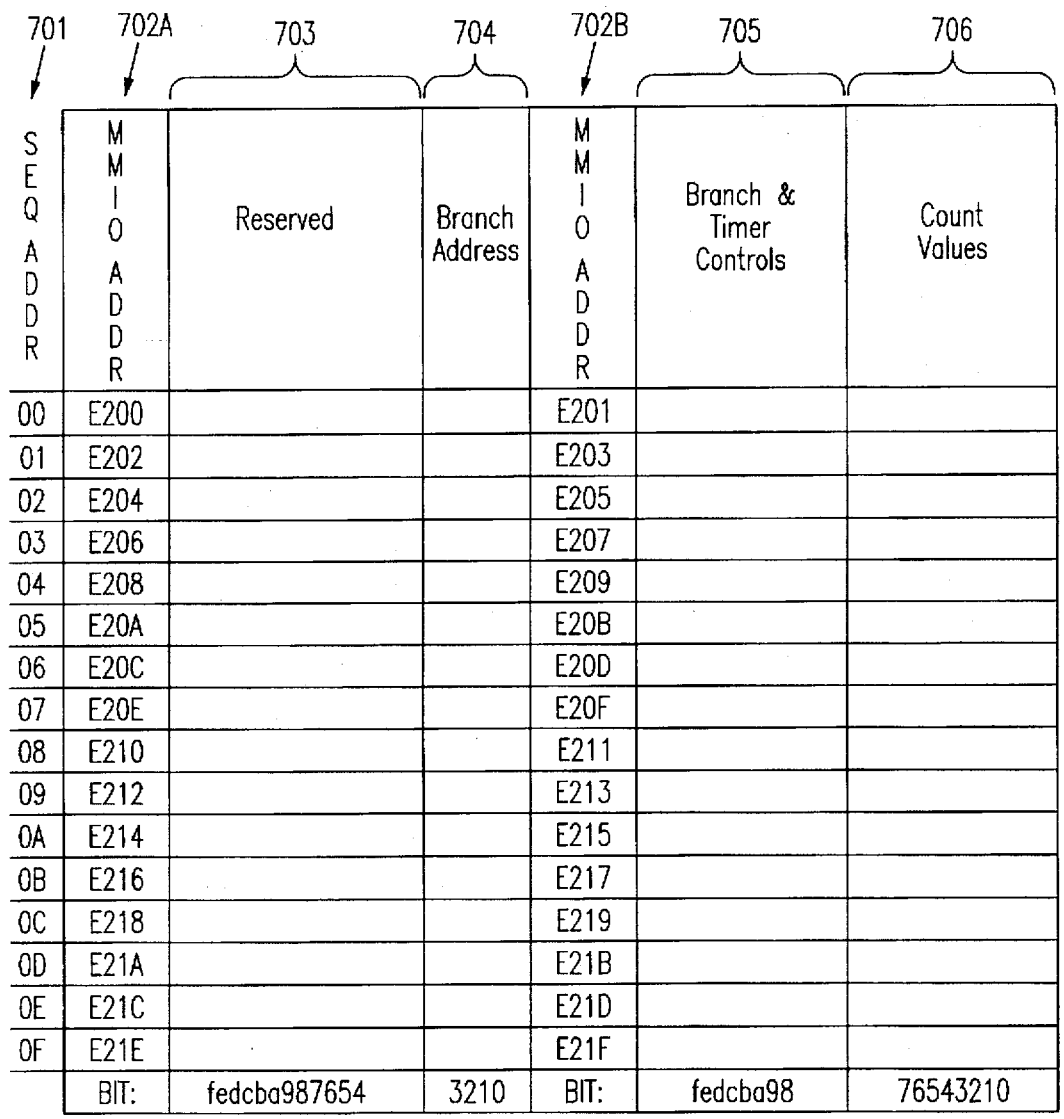
FIG. 7 is a memory map for one embodiment of the sequencer RAM in the programmable timing mark sequencer of this invention.

FIG. 7 is a map of one embodiment of sequencer RAM 241 which is two sixteen bit words wide and 16 instructions deep. In this embodiment, the valid addresses for sequencer RAM 241 are listed in memory mapped I/O address columns 702A and 702B. Timing mark sequencer addresses for each instruction are in sequencer address column 701. Notice that in this embodiment, the 12 most significant bits in column 703 of the second word in sequencer RAM 241 for each instruction are reserved. As explained more completely below, the four most significant bits of each instruction are branch address region 704 and the eight least significant bits are counter value region 706. The remaining bits are a branch and timer control region 705.

To read an instruction from sequencer RAM 241, the signal on chip select line CHIP_SELECT is driven active; the least significant five bits on DSP address bus ADDRESS <4:0> specify a valid sequencer RAM address and the size of the word being read; and the signal on read line READ is driven active. The lower 16-bits of an instruction are read from sequencer RAM 241 on data bus DATA <16:0> as a 16-bit word. A second 16-bit word is read on data bus DATA <16:0> where bits 0 to 3 of the second word are bits 16 to 19 of the instruction and the twelve most significant bits are read as zero. After the instructions are written to sequencer RAM 241, timing mark sequencer 240 is ready to begin operation.

Figure 8:
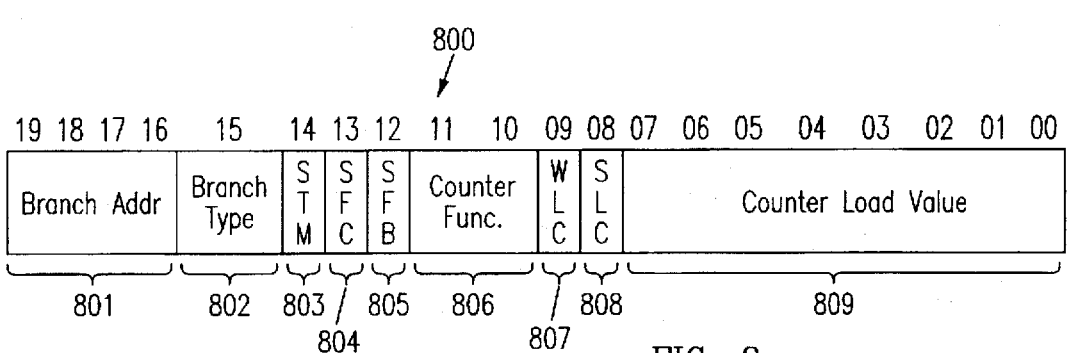
FIG. 8 illustrates the instruction format for the programmable timing mark sequencer of this invention.

Prior to considering the other elements and the operation of timing mark sequencer 240 in further detail, one embodiment of the instruction set for timing mark sequencer 240 is considered. In this embodiment, each instruction 800 (FIG. 8) has nine fields: a branch address 801 field, a branch type field 802, a servo timing mark field 803, a sync found clock field 804, a sync found branch field 805, a counter function field 806, a window counter load/count field 807, a space counter load/count field 808, and a count value field 809. Field 801 is stored in region 704 of memory 241. Fields 802 to 808 are stored in region 705 of memory 241 and field 809 is stored in region 706 of memory 241.

Table 1 presents one embodiment for each of fields 801 to 809 in instruction 800.

TABLE I

TIMING MARK SEQUENCER INSTRUCTION FORMAT

| Bit(s) | Name | Description/Function |
|---|---|---|
| 19:16 | Branch Address | A branch address which is taken if the branch condition specified in the Branch Type field is true. |
| 15 | Branch Type | 0 Branch on presence of bit HRBIT<br>1 Unconditional Branch, always branch on next clock cycle. |
| 14 | Servo Timing Mark | This bit drives the output signal of timing mark sequencer 240. This bit is asserted to generate the active servo timing mark signal STM. |
| 13 | Sync Found Clock | If this bit is set and the branch condition specified in the Branch Type field is true, a logic one is clocked into sync found flip-flop 606. |
| 12 | Sync Found Branch | If this bit is set and sync found flip-flop 606 has a logic one output signal and Counter Function is true, branch to Branch Address. |
| 11:10 | Counter Function | These bits determine how branch and fetch unit 601 uses space counter 604 and window counter 605.<br>0x Ignore counters<br>10 Remain at the current address until the branch condition is true or the value of window counter 605 is zero.<br>11 Remain at the current address until the branch condition is true or the value of space counter 604 is zero. |
| 09 | Window Counter Load/Count | 1 Count Value field is loaded into window counter 605.<br>0 Window counter is decremented by each rising clock edge of decode clock DCLK. |
| 08 | Space Counter Load/Count | 1 Count Value field is loaded into space counter 604.<br>0 Space counter 604 is decremented by each rising clock edge of decode clock DCLK. |
| 07:00 | Count Value | Value loaded into either or both of space counter 604 and window counter 605 when their Load/Count bit is set. |

When the signal on line SRCH (FIG. 4) to branch and fetch unit 601 is active, branch and fetch unit 601 decides for each clock cycle of decode clock DCLK whether timing mark sequencer 240 should repeat the current instruction in instruction register 603, execute the next sequential instruction, or branch to another instruction. Specifically, branch and fetch unit 601 processes data from the current instruction in instruction register 603, space counter 604, window counter 605, and high resolution data bit signal HRBIT to determine the address of the next instruction to apply to sequencer RAM 241.

In this embodiment, branch and fetch unit 601 determines the next address to apply to sequencer RAM 241 based upon the state of signals received from a branch opcode line 610, a four-bit next address bus 611, a two-bit counter opcode bus 612, a sync found branch line 613, a sync found line 614, a window counter zero line 615, a space counter zero line 616 and high resolution data bit line HRBIT. When signal SRCH is inactive, branch and fetch unit 601 resets and holds an address register at zero, as shown more completely below in FIG. 17.

Window counter 605 and space counter 604 are each an eight-bit down counter. A value is loaded from instruction register 603 over bus COUNT <7:0> to window counter 605 when the window counter load/count bit is set, i.e., when the signal on window load/count line 618 is active. Similarly, a value is loaded from instruction register 603 over bus COUNT <7:0> to space counter 604 when the space counter load/count bit is set, i.e., when the signal or space load/count line 617 is active. Window counter 605 drives an active signal or window counter zero output line 615 to branch and fetch unit 601 when window counter 605 has a value of 0x0000. After window counter 605 reaches a value of 0x0000, window counter 605 wraps around. Space counter 604 operates in a similar manner. Specifically, space counter 604 drives an active signal onto space counter zero output line 616 when space counter 604 has a value of 0x0000.

FIG. 9 is one embodiment of a timing mark sequencer instruction set for detecting a 2 of 3 timing mark pattern as illustrated in FIG. 5. In this example, the servo sector timing mark pattern has a space count between the first and second timing marks of 14h, which in this embodiment is the count between servo timing marks minus one half of the window width; a space count between the second and third timing marks of 0Ch; and a window count of 04h.

Timing mark sequencer instruction set 900 implements the pseudo code given below in Table 2.

TABLE 2

| Instruction Address | Function |
| --- | --- |
| 0000 | Load space counter 604 with a value of 14h; and if data bit is present, branch to address 0000. |
| 0001 | Decrement space counter 604; load window counter 605 with a value of 04h and remain at current address until data bit is present, and then branch to address 0000. Otherwise, go to next instruction when the value of space counter 604 is zero. |
| 0002 | Decrement window counter 605; load space counter 604 with a value of 0Ch and remain at current address until data bit is present, and then branch to address 0004 and clock a one into sync found flip-flop 606. Otherwise, go to next instruction when the value of window counter 605 is zero. |

TABLE 2-continued

| Instruction Address | Function |
| --- | --- |
| 0003 | Load space 604 with a value of 0Ch and unconditionally branch on next clock cycle to address 0004. |
| 0004 | Decrement space counter 604; load window counter 605 with a value of 04h and remain at current address until data bit is present, and then branch to address 0. Otherwise, go to next instruction when the value of space counter 604 is zero. |
| 0005 | Decrement window counter 605; remain at current address until either value of window counter 605 is zero and sync found flip-flop 606 is set or a data bit is present, and then branch to address 0007. Otherwise, go to next instruction when the value of window counter 605 is zero. |
| 0006 | Load space counter with a value of 14h; and unconditionally branch to address 0000. |
| 0007 | Generate servo timing mark signal and remain at address 0007. |

The set of instructions in FIG. 9 for programmable timing mark sequencer 240 are only one example of the operation of sequencer 240 and is not intended to limit the invention to this particular set of instructions. An important aspect is that novel programmable timing mark sequencer 240 with the 20-bit instructions can process a wide variety of timing synchronization patterns within a servo sector. Timing mark sequencer 240 requires only that instructions for detecting the timing synchronization pattern are loaded in instruction RAM 241 and then timing mark sequencer is provided a start signal, i.e., signal SRCH in this embodiment. After receiving the start signal, timing mark sequencer 240 processes the data in the timing synchronization pattern and generates a servo timing mark STM at the appropriate time. After initialization, timing mark sequencer 240 operates independently from any other processor in the system, e.g., both the host processor and processors onboard the disk drive.

Servo timing mark signal STM from timing mark sequencer 240 (FIG. 2) is one of the input signals to programmable burst sequencer 290. As explained above, programmable burst sequencer 290 was originally in a idle loop waiting for search signal SRCH to go active. When search signal SRCH goes active, burst sequencer 290 loads state timer 292 with a period in which servo timing mark signal STM is expected. If servo timing mark signal STM is detected within the period, burst sequencer 290 controls analysis of the remaining data in the servo sector by executing a set of instructions that were loaded in instruction RAM 295 at initialization.

In this embodiment, burst sequencer instruction RAM 295 is a static random access memory that is loaded by DSP 120 over the DSP bus. Instruction RAM 295 stores random data after a reset and so instruction RAM 295 must be initialized by DSP 120 before starting burst sequencer 290. As explained more completely below, in this embodiment, each instruction for burst sequencer 290 has thirty-eight bits.

Hence, upon power-up and reset, the instructions executed by burst sequencer 290 are loaded over the DSP data bus into instruction RAM 295 that is thirty-two instructions deep, in this embodiment. Since the DSP data bus DATA <16:0> to instruction RAM 295 is 16 bits wide and instruction RAM 295 is 38 bits wide, three writes are required to load each instruction into instruction RAM 295. Specifically, the signal on chip select line CHIP_SELECT is driven active; the least significant seven bits on the DSP address bus ADDRESS <6:0> specify a valid burst sequencer RAM address; and the signal on write line WRITE is driven active. Bits 0 and 1 of DSP address bus ADDRESS specify whether the write is to a first full 16-bit word, a second full 16-bit word, or to a 6-bit word. Address bits [6:2] specify which of the 32 burst sequencer instructions is to be written by the DSP. The least significant 16-bits of an instruction are written to instruction RAM 295 as a first 16-bit word. The sequencer RAM address is incremented and a second 16-bit word is written to instruction RAM 295. The sequencer RAM address is incremented again and a third 6-bit word is written to instruction RAM 295 where bits 0 to 5 of the third word are bits 33 to 37 of the instruction and the remaining bits are initialized to zero. A fourth 16-bit word is defined to keep the burst sequencer instructions aligned to a four word address boundary, but there is no RAM for the unused bits in the third word and the fourth word.

FIG. 10 is a map of one embodiment of instruction RAM 295 which is thirty-eight bit words wide and 32 instructions deep. In this embodiment, the valid addresses for sequencer RAM 295 are listed in memory mapped I/O address columns 1002A to 1002D. The burst sequencer addresses for each instruction are in burst sequencer address column 1001. Notice that in this embodiment, the 10 most significant bits of the third word in column 1004 and the fourth word in column 1003 of each instruction in instruction RAM 295 are reserved. In fact, this portion of instruction RAM 295 is not populated with memory and is used only for alignment purposes.

As explained more completely below, the six most significant bits of each instruction are stored in timer and latch control region 1005 that is a six-bit wide column. The most significant eight bits of the second word of each instruction are stored in pin values region 1006 that is an eight-bit wide column. The next five bits of the second word of each instruction are stored in sequencer signals region 1007, that is a five-bit wide column, and the three least significant bits of the second word are stored in branch type region 1008, that is a three-bit wide column. The most significant bit of the first word is stored in interrupt region 1009 that is a one-bit column and the next five bits are stored in branch address region 1010 that is a five-bit wide column. The ten least significant bits of the instruction are stored in timer load value region 1011 that is a ten-bit wide column. The particular definition of each of the bits in an instruction are described more completely below with reference to Table 3.

In view of the above discussion of reading an instruction from timing mark sequencer RAM 241, reading an instruction from instruction RAM 295 is not discussed herein. The sequence of steps is similar to that discussed above with the difference in instruction size and memory size taken into consideration.

The instruction retrieved from instruction RAM 295 and loaded into instruction decoder 291 is determined by the address applied to instruction RAM 295 by address control circuit 294 which in turned is controlled by information from branch logic circuit 293. Thus, branch logic circuit 293 and address control circuit 294 are an address generation circuit. Specifically, branch logic circuit 293 receives three input signals from other elements of programmable servo burst decoder 130, i.e., (i) servo timing mark signal STM from timing mark sequencer 240, (ii) search signal SRCH from servo timing control circuit 230, and (iii) missing STM signal from missing STM latch 280. Branch logic circuit 293 also receives a branch select signal on branch select bus BRSEL that is generated by the branch type bits in the current instruction in instruction decoder 291 and a timeout signal from a state timer 292.

As explained more completely below in the detailed discussion of a burst sequencer instruction, the branch logic circuit 293 evaluates the possible conditions specified in the branch type field of an instruction and provides signals to address control circuit 294 that instruct address control circuit 294 to either address the next sequential address, remain at the same address, or branch to the address specified on branch address bus BRADR from instruction decoder 291.

Instruction decoder 291 generates a plurality of signals that either control, enable, or provide data for operation of gray code shift register 260, index bit latch 270, missing STM latch 280, servo timing control circuit 230, write gate control circuit 265 as well as signals to pins of programmable servo burst decoder 130. The operation and interaction of each of the various circuits within burst sequencer 290 is discussed more completely below in the discussion of the instruction format for burst sequencer 290.

Table 3 gives the name of each field in this embodiment of an instruction for burst sequencer 290 and the particular bits in each field. The use of each field is described below.

TABLE 3

BURST SEQUENCER INSTRUCTION FORMAT

| Bit(s) | Name | Bit(s) | Name | Bit(s) | Name |
| --- | --- | --- | --- | --- | --- |
| 37 | Set Missing STM | 36 | Reset Missing STM | 35 | Flag Set |
| 34 | Flag Reset | 33 | Search Reset | 32 | Timer Reset |
| 31 | Gate A | 30 | Gate B | 29 | Gate C |
| 28 | Gate D | 27 | Discharge | 26 | Select A |
| 25 | Extra Select 2 | 24 | Extra Select 1 | 23 | Write Disable |
| 22 | Enable Gray Code Shift | 21 | Enable Index Latch | 20 | Servo Sector |
| 19 | Start Data Acquisition | 18:16 | Branch Type | 15 | Interrupt |
| 14:10 | Branch Address | 09:00 | Timer Load Value | | |

If set missing STM bit is set in the instruction in instruction decoder 291, burst sequencer 290 drives an active signal on line 282 to a set terminal of missing STM latch 280, and so missing STM latch 280 is set. Setting missing STM latch 280 drives an active signal on missing STM line to sector/index pulse generation circuit 231 and sets missing STM bit in decoder status register DECSTA (Table 22) in status and configuration registers 210. Conversely, if reset missing STM bit is set in the instruction in instruction decoder 291, burst sequencer 290 drives an active signal on line 281 to a reset terminal of missing STM latch 280 that resets missing STM latch 280. If the instruction has both bits set, reset missing STM bit has priority, and missing STM latch 280 is reset.

When flag set bit is set in the current instruction, (herein the current instruction is the instruction in instruction decoder 291) burst sequencer 290 sets a flag bit, bit 12, in decoder status register DECSTA (Table 22) in status and configuration registers 210. The flag bit can be used to provide status to DSP 120 and as an intermediate storage location that is used by branch logic circuitry 293. Conversely, when flag reset bit is set in the current instruction, burst sequencer 290 resets the flag bit in decoder status register DECSTA. If an instruction has both flag bits set, the reset flag bit has priority, and the flag bit in decoder status register DECSTA is reset.

When the search reset bit in the current instruction is active, burst sequencer 290 drives an active signal on reset search line RST_SRCH to servo timing control circuit 230, which in turn resets signal SRCH if signal SRCH is active. The active signal on reset search line RST_SRCH resets SRCH bit in decoder status register DECSTA (Table 22) in status and configuration registers 210. Similarly, when the timer reset bit in the current instruction is active, burst sequencer 290 drives an active signal on reset timer line RST_TIMER to servo timing control circuit 230, which in turn resets servo sector timer 233 if servo timer 233 is active.

When gate A bit, gate B bit, gate C bit, or gate D bit is set in the current instruction, burst sequencer 290 drives an active signal on a line, corresponding to each bit that is set, to gate multiplexer 285. Depending on the bits set in status and configuration registers 210, gate multiplexer 285 passes the signals therethrough to a pin of the integrated circuit. These pins are labelled GTA, GTB, GTC, and GTD in FIG. 2. Typically, gate A bit, gate B bit, gate C bit, or gate D bits are set to gate position burst detectors in read channel integrated circuit 190.

When discharge bit DISC is set in the current instruction, burst sequencer 290 drives an active signal on a line corresponding to bit DISC to gate multiplexer 285. Depending on a state of a bit in status and configuration registers 210, gate multiplexer 285 passes the signal therethrough to a pin DISC. Typically, discharge bit DISC is used to generate a signal that is used to discharge the position burst detectors in read channel integrated circuit 190.

When select A bit SELA is set in the current instruction, burst sequencer 290 drives an active signal on a line corresponding to bit SELA to gate multiplexer 285. Depending on a state of a bit in status and configuration registers 210, gate multiplexer 285 passes the active signal therethrough to a pin SELA. Typically, select A bit SELA is used to generate a signal that is used for automatic gain control in servo burst processing, but this signal can also be using for another gating function.

When the extra select two bit is set in the current instruction, burst sequencer 290 drives an active signal on a line XS2 to gate multiplexer 285. Depending on a state of a bit in status and configuration registers 210, gate multiplexer 285 passes the signal therethrough to a pin XS2. Typically, bit XS2 is used to generate an extra gate signal such as beginning of sector BOS, or an extra synchronization signal.

When the extra select one bit is set in the current instruction, burst sequencer 290 drives an active signal on a line XS1 to gate multiplexer 285. Depending on a state of a bit in status and configuration registers 210, gate multiplexer 285 passes the signal therethrough to a pin XS1. Typically, the extra select one bit is used to generate an extra gate signal such as end of sector EOS, or an extra synchronization signal.

When the write disable bit is set in the current instruction, burst sequencer 290 drives an active signal on a line WRTDIS to write gate control circuit 265. The active signal on line WRTDIS disables a write during a servo sector by blocking generation of the qualified write gate signal QWRTGT by write gate control circuit 265.

When the enable gray code shift bit is set in the current instruction, burst sequencer 290 drives an active signal on an enable shift line ENGRAY to gray code shift register 260. The active signal on enable shift line ENGRAY allows cell clock CCLK from data synchronizer 275 to shift gray code bits in the servo burst into gray code shift register 260.

In this embodiment, gray code shift register 260 is a 16-bit register that is loaded with data bits from data synchronizer 275 during a window defined by the time period the signal on enable shift line ENGRAY is active. As each bit is shifted into gray code shift register 260 by cell clock CCLK, the bit can be processed by exclusive OR gate 277 to decode the gray code to binary. The operation of exclusive OR gate is determined by EXOR disable bit in decode status register DECSTA (Table 22). If the EXOR disable bit is not set, as each bit is applied to one terminal of exclusive OR gate 277, the previous bit from exclusive OR gate 277, i.e., the bit that was just clocked into gray code shift register 260, is applied to the other terminal of exclusive OR gate 277. The first bit processed by exclusive OR gate 277 is processed with a logic zero on the other terminal of exclusive OR gate 277. When the signal on enable shift line ENGRAY goes inactive, gray code shift register 260 contains the coarse radial address and supplies that address to write gate qualifier address compare circuit 250.

When the enable index latch bit is set in the current instruction, burst sequencer 290 drives an active signal on a line ENINXB to index bit latch 280. The active signal on line ENINXB allows cell clock CCLK from data synchronizer 275 to latch a data bit DBIT. The active signal on line ENINXB is effectively a window for index bit latch 270, i.e., a storage element, in which is expected a signal on line DBIT. Index bit latch 270 can be enabled more than once during a servo burst, sometimes called a servo sector, if redundant index bits are included in the servo sector. The resulting latch condition that is reflected in index detected bit in decoder status register DECSTA (Table 16) is the logic OR function of the redundant index bits. Alternatively, the redundant index bits could be processed using a logic AND function. Index bit latch 270 is reset by writing a one to reset index bit in decoder control register DECCTL (Table 20) in status and configuration registers 210.

Signals ENGRAY and ENIDXB need to remain active for two periods of decode clock DCLK after the actual window to allow for latching of the data. In practice, enable latch signal ENIDXB is lengthened by two periods of decode clock DCLK, and enable shift signal ENGRAY is delayed two periods of decode clock DCLK on the rising and falling edges of enable shift signal ENGRAY.

When the servo sector bit is set in the current instruction, burst sequencer 290 drives an active signal on pin SSEC. When start data acquisition bit is set, burst sequencer 290 drives an active signal on line STRT1 to analog data acquisition system 100. The start data acquisition bit must go inactive for one cycle of decode clock DCLK before the bit is reasserted.

The branch type bits can take on a multiplicity of values. In this embodiment, the various branch conditions represented by the branch type bits are given in Table 4. The branch type bits of a particular instruction in instruction decoder 291 are provided to branch logic circuit 293. Branch logic circuit 293 evaluates whether the branch condition is satisfied; whether state timer 292 has timed out; and whether one or more of signals STM, SRCH and MISSING_STM has been driven active or inactive. Branch logic circuit 293 provides signals to address control logic 294 that instruct address control logic 294 to stay at the current address, increment the current address, or jump to the branch address specified in the five branch address bits of the current instruction in instruction decoder 291.

TABLE 4

| Branch Type | Name | Branch Condition |
|---|---|---|
| 000 | Never Branch. | Always execute the next sequential instruction when a state timer 292 times out. |
| 001 | Missing STM. | Branch if a missing STM latch 280 is set, and otherwise go to the next sequential instruction when state timer 292 times out. |
| 010 | SRCH. | Branch if signal SRCH is active, and otherwise go to the next sequential instruction when the state timer 292 times out. |
| 011 | STM and SRCH. | Branch if servo timing mark STM is detected and signal SRCH is active, and otherwise go to the next sequential instruction when state timer 292 times out. |
| 100 | Flag. | Branch if the flag bit in decoder status register DECSTA (Table 22) is set, and otherwise go to the next sequential instruction when state timer 292 times out. |
| 101 | Branch Bit. | Branch if the branch bit is set in the decoder control register DECSTA, and otherwise go to the next sequential instruction when the state timer 292 times out. |
| 110 | Branch Bit Timed. | Branch when state timer 292 has a zero value if the branch bit is set in the decoder control register DECCTL, and otherwise go to the next sequential instruction when state timer 292 times out. |
| 111 | Unconditional Branch | Always branch immediately. |

When the interrupt bit is set in the current instruction, burst sequencer 290 drives an active interrupt signal on line INT to DSP 120.

The timer load value in the instruction in instruction decoder 291 is loaded into state timer 292 upon execution of that instruction. The instruction is executed for this time period unless a branch condition becomes valid.

Figure 12:
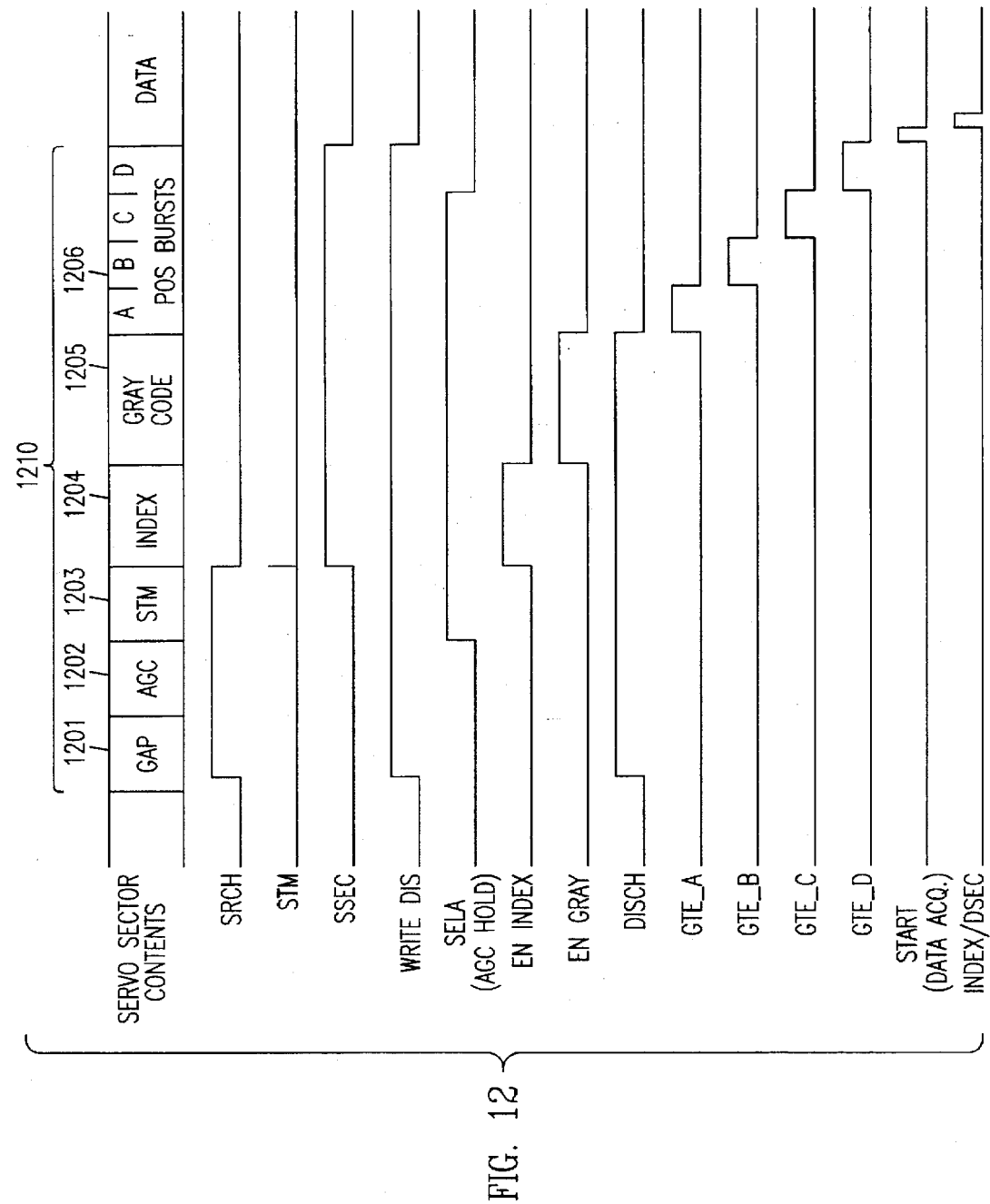
FIG. 12 is a timing diagram of the signals generated by the programmable burst sequencer of this invention in the execution of the instructions in FIGS. 11A and 11B.

FIGS. 11A and 11B are a set of instructions for programmable burst sequencer 290 that would be loaded by DSP 120 into instruction RAM 295 to process servo sectors with the format shown in FIG. 12. (Note that signals in FIG. 4 and FIG. 12 with the same reference numeral are the same.) Servo sector 1210 has in the following order a write-splice gap 1201, an automatic gain field 1202, a servo timing mark field 1203, an index field 1204, a gray code field 1205 and a position field 1206 that has four position bursts A, B, C, and D.

Instruction 00h in FIGS. 11A and 11B specifies the operations by burst sequencer 290 given in Table 5.

TABLE 5

| Instruction Address | Function |
|---|---|
| 00 | Load state counter 292 with a value of 0FFh and execute instruction 00h for this period unless search signal SRCH becomes active and then branch to address 02. All output signals from instruction decoder 291 are held inactive for this address |

Thus, initially, the signals on lines SSEC, STRT1, WRTDIS, SELA, GTA, GTB, GTC, and GTD are all inactive. If search signal SRCH remains inactive and state timer 292 times out, processing transfer from instruction 00h to instruction 01h. Instruction 01h in FIGS. 11A and 11B specifies the operations by burst sequencer 290 given in Table 6. In FIGS. 11A and 11B, if there is no entry in a field of the instruction, the entry is a zero.

TABLE 6

| Instruction Address | Function |
|---|---|
| 01 | Load state counter 292 with a value of 000h and branch immediately to address 00. All output signals from instruction decoder 291 are held inactive at this address. |

Hence, instruction 01h simply returns processing to instruction 00h. Therefore, instructions 00h and 01h form the idle loop for burst sequencer 290 discussed above. When signal SRCH goes active, branch logic circuit 293 detects signal SRCH (FIG. 12) and indicates to address control logic 294 to load address 02h from instruction RAM 295 into instruction decoder 291. Consequently, instruction 02h is loaded into instruction decoder 291. Instruction 02h in FIGS. 11A and 11B specifies the operations by burst sequencer 290 given in Table 7.

TABLE 7

| Instruction Address | Function |
|---|---|
| 02 | Load state counter 292 with a value of 020h and execute instruction 02h until state timer 292 times out and then execute instruction 03h; hold start data acquisition signal STRT1, servo sector signal SSEC, select A signal SELA, gate A signal GTA, gate B signal GTB, gate C signal GTC and gate D signal GTD inactive; and set write disable signal WRTDIS (FIG. 12) and discharge signal DISC active. |

Thus, when signal SRCH goes active, burst sequencer 290 first disables the write gate and so prevents overwriting the servo sector. Burst sequencer 290 also drives the discharge signal on line DISC to gate multiplexer 285 active. The signal on line DISC is passed through gate multiplexer 285 if the appropriate bit is set in gating configuration register GTECFG, that is described more completely below, within status and configuration registers 210.

When state timer 292 times out, the signal on line TIMER0 to branch logic circuit 293 goes active and branch logic circuit 293 instructs address control circuit 294 to increment the sequencer instruction address to address 03h. Instruction 03h is loaded in instruction decoder 291.

Instruction 03h in FIGS. 11A and 11B specify the operations by burst sequencer 290 given in Table 8.

TABLE 8

| Instruction Address | Function |
|---|---|
| 03 | Load state counter 292 with a value of 1FFh and execute instruction 03h for this period unless signals SRCH and STM are both active and then branch to address 05h; hold start data acquisition signal STRT1, servo sector signal SSEC, gate A signal GTA, gate B signal GTB, gate C signal GTC and gate D signal GTD inactive; hold write disable signal WRTDIS and discharge signal DISC active; and set select A signal SELA. |

Burst sequencer 290 in executing instruction 03h drives the select A signal on line SELA to gate multiplexer 285 active. The signal on line SELA is passed through gate multiplexer 285 if the appropriate bit is set in gating configuration register GTECFG, that is described more completely below, within status and configuration registers 210. In this embodiment, signal SELA (FIG. 12) is used as an AGC hold signal.

Since signal SRCH is active, burst sequencer 290 waits for a maximum of 543 periods of decode DCLK (1FFh+20h) for signal STM, and during this period holds signals SELA, WRTDIS, and DISC active. If state timer 292 times out before signal STM is received by branch logic circuit 293, the time out signal on line TIMER0 to branch logic circuit 293 goes active and branch logic circuit 293 instructs address control logic 294 to increment the sequencer instruction address to address 04h. Instruction 04h in FIGS. 11A and 11B specifies the operations by burst sequencer 290 given in Table 9.

TABLE 9

| Instruction Address | Function |
|---|---|
| 04 | Load state counter with a value of 00h and branch unconditionally to address 00h; set start data acquisition signal STRT1, servo sector signal SSEC, write disable signal WRTDIS, and select A signal SELA, discharge signal DISC, gate A signal GTA, gate B signal GTB, gate C signal GTC and gate D signal GTD inactive; set timer reset signal RST_TIMER and reset search signal RST_SRCH active, and set missing STM latch signal active. |

Hence, if timing mark sequencer 240 fails to generate servo timing mark signal STM within a predetermined number of clock periods after signal SRCH goes active, missing STM latch 280 is set by the active set missing STM latch signal on line 282. Signal search SRCH is reset by the active reset search signal on line RST_SRCH to servo timing control circuit 230. Servo sector timer 233 is reset by the active timer reset signal on line RST_TIMER. Processing in burst sequencer 290 returns to instruction 00h, that was described above. When signal SRCH goes active again, processing branches from instruction 00h to instruction 02h and consequently to instruction 03h. If timing mark sequencer 240 generates servo timing mark signal STM while instruction 03h is executing, branch logic circuit 293 instructs address control circuit 294 to apply the branch address in instruction 03h to instruction RAM 295 and consequently instruction 05h is loaded into instruction decoder 291.

Instruction 05h in FIGS. 11A and 11B specifies the operations by burst sequencer 290 given in Table 10.

TABLE 10

| Instruction Address | Function |
|---|---|
| 05 | Load state counter 292 with a value of 05h and execute instruction 05h until state timer 292 times out and then execute instruction 06h; hold start data acquisition signal STRT1, gate A signal GTA, gate B signal GTB, gate C signal GTC, and gate D signal GTD inactive; hold write disable signal WRTDIS, discharge signal DISC and select A signal SELA active; and set enable index signal ENIDXB, servo sector signal SSEC, timer reset signal RST_TIMER, and reset search signal RST_SRCH active. |

Upon execution of instruction 05h, search signal SRCH (FIG. 12) is reset by active reset search signal on line RST_SRCH to servo timing control circuit 230. Servo sector timer 233 is reset by the active timer reset signal on line RST_TIMER. Index enable bit signal ENIDXB (FIG. 12) to index bit latch 270 enables latch 270 so that the next data bit signal on line DBIT is clocked into index latch 270 on the next clock edge on code clock line CCLK. Servo sector signal SSEC (FIG. 12) is also driven active. When state timer 292 times out for instruction 05h, the time out signal on line TIMER0 to branch logic circuit 293 goes active and branch logic circuit 293 instructs address control circuit 294 to increment the burst sequencer instruction address to address 06h. Instruction 06h is loaded into instruction decoder 291.

Instruction 06h in FIGS. 11A and 11B specifies the operations by burst sequencer 290 given in Table 11.

TABLE 11

| Instruction Address | Function |
|---|---|
| 06 | Load state counter 292 with a value of 40h and execute instruction 06h until state timer 292 times out and then execute instruction 07h; hold start data acquisition signal STRT1, gate A signal GTA, gate B signal GTB, gate C signal GTC, and gate D signal GTD inactive; set enable index signal ENIDXB, timer reset signal RST_TIMER, and reset search signal RST_SRCH inactive; hold write disable signal WRTDIS, discharge signal DISC, select A signal SELA, and servo sector signal SSEC active; and set enable shift signal ENGRAY active. |

Upon execution of instruction 06h, state timer 292 is set to a value of 40h and timer reset signal RST_TIMER, reset search signal RST_SRCH, and enable index signal ENIDXB are all driven inactive. In response to active enable shift signal ENGRAY (FIG. 12), data bits on line DBIT are clocked into gray code shift register 260 by code clock signal CCLK. Specifically, as explained above, each data bit on line DBIT is combined in exclusive OR gate 277 with the previous bit from exclusive OR gate 277. This converts the gray code data bits on line DBIT to binary data bits that are clocked into gray code shift register 260, which, in this embodiment, is a 16-bit shift register. The first bit on line DBIT is combined with a logic zero in exclusive OR gate 277. The binary coarse position data in gray code shift register 260 can be read by DSP 120 and is also supplied to write gate qualifier address compare circuit 250.

When state timer 292 times out for instruction 06h, the signal on line TIMER0 to branch logic circuit 293 goes active and branch logic circuit 293 instructs address control circuit 294 to increment the sequencer instruction address to address 07h. Instruction 07h is loaded into instruction decoder 291.

Instruction 07h in FIGS. 11A and 11B specifies the operations by burst sequencer 290 given in Table 12.

TABLE 12

| Instruction Address | Function |
|---|---|
| 07 | Load state counter 292 with a value of 00Fh and execute instruction 07h until state timer 292 times out and then execute instruction 08h; hold start data acquisition signal STRT1, enable index signal ENIDXB, timer reset signal RST_TIMER, and reset search signal RST_SRCH, gate B signal GTB, gate C signal GTC, and gate D signal GTD inactive; set discharge signal DISC and enable shift signal ENGRAY inactive; hold write disable signal WRTDIS, select A signal SELA, and servo sector signal SSEC active; and set gate A signal GTA active. |

Upon execution of instruction 07h, discharge signal DISC and enable shift signal ENGRAY are reset and state timer 292 is loaded with a value of 00Fh. Burst sequencer 290 also drives the gate A signal (FIG. 12) on line GTA to gate multiplexer 285 active. The signal on line GTA is passed through gate multiplexer 285 if the appropriate bit is set in gating configuration register GTECFG, that is described more completely below, within status and configuration registers 210. The active signal on line GTA is applied to read channel integrated circuit 190 to capture the peak of the first servo position burst.

When state timer 292 times out for instruction 07h, the signal on line TIMER0 to branch logic circuit 293 goes active and branch logic circuit 293 instructs address control circuit 294 to increment the sequencer instruction address to address 08h. Instruction 08h is loaded into instruction decoder 291.

Instruction 08h in FIGS. 11A and 11B specifies the operations by burst sequencer 290 given in Table 13.

TABLE 13

| Instruction Address | Function |
|---|---|
| 08 | Load state counter 292 with a value of 00Fh and execute instruction 08h until state timer 292 times out and then execute instruction 09h; hold start data acquisition |

TABLE 13-continued

| Instruction Address | Function |
|---|---|
| | signal STRT1, enable index signal ENIDXB, timer reset signal RST_TIMER, and reset search signal RST_SRCH, discharge signal DISC, enable shift signal ENGRAY, gate C signal GTC, and gate D signal GTD inactive; set gate A signal GTA inactive; hold write disable signal WRTDIS, select A signal SELA, and servo sector signal SSEC active; and set gate B signal GTB active. |

Upon execution of instruction 08h, gate A signal GTA is reset and state timer 292 is loaded with a value of 00Fh. Burst sequencer 290 also drives the gate B signal on line GTB to gate multiplexer 285 active. The signal on line GTB is passed through gate multiplexer 285 if the appropriate bit is set in gating configuration register GTECFG, that is described more completely below, within status and configuration registers 210. The active signal on line GTB is applied to read channel integrated circuit 190 to capture the peak of the second servo position burst.

When state timer 292 times out for instruction 08h, the signal on line TIMER0 to branch logic circuit 293 goes active and branch logic circuit 293 instructs address control circuit 294 to increment the sequencer instruction address to address 09h. Instruction 09h is loaded into instruction decoder 291.

Instruction 09h in FIGS. 11A and 11B specifies the operations by burst sequencer 290 given in Table 14.

TABLE 14

| Instruction Address | Function |
|---|---|
| 09 | Load state counter 292 with a value of 00Fh and execute instruction 09h until state timer 292 times out and then execute instruction 0Ah; hold start data acquisition signal STRT1, enable index signal ENIDXB, timer reset signal RST_TIMER, reset search signal RST_SRCH, discharge signal DISC, enable shift signal ENGRAY, gate A signal GTA, and gate D signal GTD inactive; set gate B signal GTB inactive; hold write disable signal WRTDIS, select A signal SELA, and servo sector signal SSEC active; and set gate C signal GTC active. |

Upon execution of instruction 09h, gate B signal GTB is reset and state timer 292 is loaded with a value of 00Fh. Burst sequencer 290 also drives the gate C signal on line GTC to gate multiplexer 285 active. The signal on line GTC is passed through gate multiplexer 285 if the appropriate bit is set in gating configuration register GTECFG, that is described more completely below, within status and configuration registers 210. The active signal on line GTC is applied to read channel integrated circuit 190 to capture the peak of the third servo position burst.

When state timer 292 times out for instruction 09h, the signal on line TIMER0 to branch logic circuit 293 goes active and branch logic circuit 293 instructs address control circuit 294 to increment the sequencer instruction address to address 0Ah. Instruction 0Ah is loaded into instruction decoder 291.

Instruction 0Ah in FIGS. 11A and 11B specifies the operations by burst sequencer 290 given in Table 15.

TABLE 15

| Instruction Address | Function |
|---|---|
| 0A | Load state counter 292 with a value of 00Fh and execute instruction 0Ah until state timer 292 times out and then execute instruction 0Bh; hold start data acquisition signal STRT1, enable index signal ENIDXB, timer reset signal RST_TIMER, reset search signal RST_SRCH, discharge signal DISC, enable shift signal ENGRAY, gate A signal GTA, and gate B signal GTB inactive; set gate C signal GTC and select A signal SELA inactive; hold write disable signal WRTDIS and servo sector signal SSEC active; and set gate D signal GTD active. |

Upon execution of instruction 0Ah, gate C signal GTC and select A signal SELA are reset, and state timer 292 is loaded with a value of 00Fh. Burst sequencer 290 also drives the gate D signal on line GTD to gate multiplexer 285 active. The signal on line GTD is passed through gate multiplexer 285 if the appropriate bit is set in gating configuration register GTECFG, that is described more completely below, within status and configuration registers 210. The active signal on line GTD is applied to read channel integrated circuit 190 to capture the peak of the fourth servo position burst.

When state timer 292 times out for instruction 0Ah, the signal on line TIMER0 to branch logic circuit 293 goes active and branch logic circuit 293 instructs address control circuit 294 to increment the sequencer instruction address to address 0Bh. Instruction 0Bh is loaded into instruction decoder 291.

Instruction 0Bh in FIGS. 11A and 11B specifies the operations by burst sequencer 290 given in Table 16.

TABLE 16

| Instruction Address | Function |
|---|---|
| 0B | Load state counter 292 with a value of 02h and execute instruction 0Bh until state timer 292 times out and then execute instruction 0Ch; hold select A signal SELA, enable index signal ENIDXB, timer reset signal RST_TIMER, reset search signal RST_SRCH, discharge signal DISC, enable shift signal ENGRAY, gate A signal GTA, gate B signal GTB, and gate C signal GTC inactive; set gate D signal GTD, write disable signal WRTDIS and servo sector signal SSEC inactive; and set start data acquisition signal STRT1 active. |

Upon execution of instruction 0Bh, set gate D signal GTD, write disable signal WRTDIS and servo sector signal SSEC are reset, and state timer 292 is loaded with a value of 02h. Burst sequencer 290 also drives start data acquisition signal STRT1 on line 170 to analog data acquisition system 100 so that analog data acquisition system 100 can process the four analog servo position bursts captured in read channel integrated circuit 190.

When state timer 292 times out for instruction 0Bh, the signal on line TIMER0 to branch logic circuit 293 goes active and branch logic circuit 293 instructs address control circuit 294 to increment the sequencer instruction address to address 0Ch. Instruction 0Ch is loaded into instruction decoder 291.

Instruction 0Ch in FIGS. 11A and 11B specifies the operations by burst sequencer 290 given in Table 17.

TABLE 17

| Instruction Address | Function |
|---|---|
| 0C | Load state counter 292 with a value of 0000h and branch immediately to address 00h; hold select A signal SELA, enable index signal ENIDXB, timer reset signal RST_TIMER, and reset search signal RST_SRCH, discharge signal DISC, enable shift signal ENGRAY, gate A signal GTA, gate B signal GTB, and gate C signal GTC inactive; set gate D signal GTD, write disable signal WRTDIS and servo sector signal SSEC inactive; set start data acquisition signal STRT1 inactive; and set DSP interrupt signal INT active. |

Hence, instruction 0Ch returns processing to instruction 00h, resets start data acquisition signal STRT1 and generates a DSP interrupt signal to notify the DSP that processing of the servo burst is complete.

The set of instructions in FIGS. 11A and 11B for programmable burst 290 are only one example of the operation of burst sequencer 290 and is not intended to limit the invention to this particular set of instructions. An important aspect is that novel programmable burst sequencer 290 with the 38-bit instructions can process a wide variety of servo sector formats. Burst sequencer 290 requires only that instructions for processing a servo sector format are loaded in instruction RAM 295 and then burst sequencer 290 is provided the input signals described above. After initialization, burst sequencer 290 operates independently from any other processor in the system, e.g., both the host processor and processors onboard the disk drive.

Figure 13:
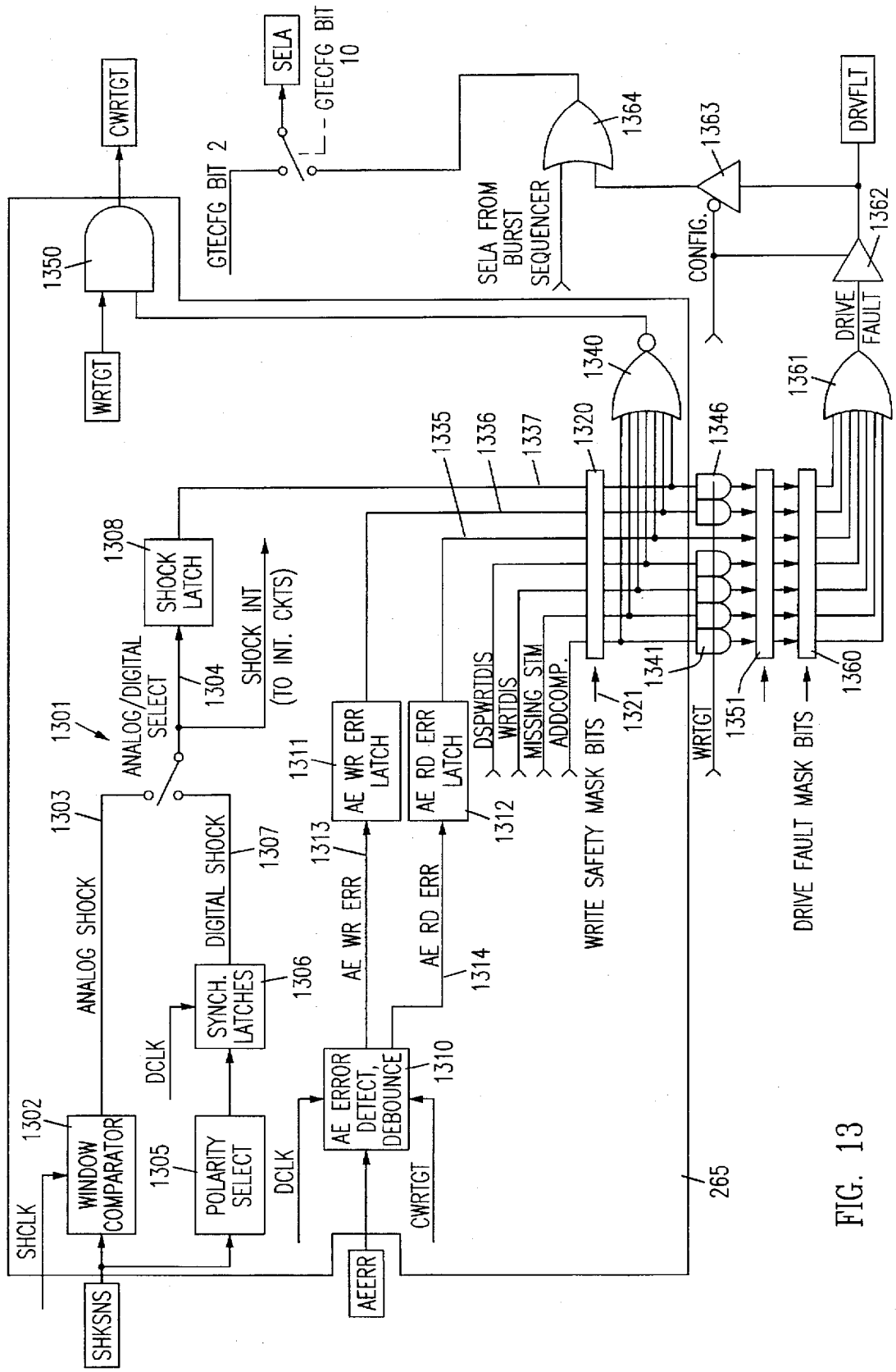
FIG. 13 is a more detailed diagram of one embodiment of the write gate/drive fault control circuit of this invention.

FIG. 13 is a more detailed diagram of a drive fault control circuit and write gate control circuit 265 within programmable servo burst decoder 130 of this invention. Write gate control circuit 265 qualifies a write gate on line WRTGT from a pin of integrated circuit 150 from a data path controller before the write gate is used by the disk drive write circuitry to write data to the disk. In this embodiment, the active level of qualified write gate signal QWRTGT from write gate control circuit 265 and write gate signal WRTGT are programmably selectable by setting or resetting negative QWRTGT bit and negative WRTGT bit, respectively in write gate disable drive fault register WRGTDF. In the embodiment of write gate control circuit 265 illustrated in FIG. 13, qualified write gate signal QWRTGT is active high. Prior to considering the operation of write gate control circuit 265 further, each of the input signals to write gate control circuit 265 and the generation of the input signals is described and then the detailed operations of write gate control circuit 265 is described. The description of write gate control circuit 265 is followed by a description of the drive fault control circuit.

Write gate control circuit 265 receives a write gate signal WRTGT from a pin of the integrated circuit, as described above, and a shock sensor signal SHKSNS from another pin of the integrated circuit. Integrated circuit 150 can be configured to process shock sensor input signal SHKSNS as either a digital signal or an analog signal by analog/digital select switch 1301, which is a logic circuit switch that is controlled by a shock sensor pin mode select bit within a register in status configuration registers 210.

When analog/digital select switch 1301 is configured to select the analog signal, shock sensor signal SHKSNS is processed initially by window comparator circuit 1302 that also receives a clock signal SHCLK. Window comparator circuit 1302 is a sampling mode window comparator circuit in which the sampling architecture ignores narrow noise spikes that could cause false shock events. The analog shock signal on output line 1303 is passed through switch 1301 to input line 1304 of shock latch 1308 and to shock interrupt line SHOCK_INT that goes to interrupt circuits of integrated circuit 150.

When analog/digital select switch 1301 is configured to select the digital signal, shock sensor signal SHKSNS is processed initially by a polarity select circuit 1305 that defines the active state of the signal on pin SHKSNS when the shock sensor pin mode select bit, that is described below, is inactive, i.e., analog/digital select switch 1301 selects the digital input signal. The output signal from polarity select circuit 1305 is latched in synchronization latch circuit 1306 by decode clock DCLK. The output signal of synchronization latch circuit 1306 on line 1307 is passed through analog/digital switch 1301 to input line 1304 of shock latch 1308.

The input signal to shock latch 1308 is latched for use in generating a drive fault signal on line DRVFLT and qualified write gate signal QWRTGT. The output signal of shock latch 1308 on line 1337 is combined with the corresponding write gate disable bit from write gate disable drive fault register WRGTDF (Table 24), that is described below, in write safety mask circuit 1320.

Write gate control circuit 265 receives an arm electronics fault signal AEERR from another pin of integrated circuit 150. Alternatively, fault signal AEERR can indicate a fault in the head interface electronics. AE error detect circuit 1310 compares the level of fault signal AEERR with the level of qualified write gate signal QWRTGT. The comparison is blanked for nominally 160 periods of decode clock DCLK, e.g., for about 4 µs for a 40 MHz decode clock DCLK, when qualified write gate signal QWRTGT makes a transition.

If the level of fault signal AEERR and the level of qualified write gate signal QWRTGT are not the same when qualified write gate signal QWRTGT is active, AE error detect circuit 1310 drives an active signal on AE write error line 1313 to AE write error latch 1311. AE write error latch 1311 stores the active signal and generates an output signal to write safety mask circuit 1320 on line 1336.

Conversely, if the level of fault signal AEERR and the level of qualified write gate signal QWRTGT are not the same when qualified write gate signal QWRTGT is inactive, AE error detect circuit drives an active signal on AE read error line 1314 to AE read error latch 1312. AE write error latch 1312 stores the active signal and generates an output signal to write safety mask circuit 1320 on line 1335.

Write gate qualifier address compare circuit 250 generates an active signal on address compare input line ADDCOMP to write gate control circuit 265 when the address in gray code shift register 260 and a target address register TGTADR are the same. Target address register TGTADR is loaded with a binary target track address over the DSP bus by DSP 120 at the start of each seek. In one embodiment, target address register TGTADR is a 16-bit read/write register. In addition to target address register TGTADR, write gate qualifier address compare circuit 250 also includes an address compare mask register ADRMSK. The address comparison between target address register TGTADR and gray code shift register 260 can be configured for only the length of the gray code by setting mask bits in address compare mask register ADRMSK.

When a bit location is set in register ADRMSK, the address compare circuit does not require a bit match in that location. This allows for the use of 1 to 16 bit gray code lengths since in this embodiment, address compare mask register is a 16-bit read/write register. Burst sequencer 290 controls the number of bits shifted into gray code shift register 260 by the length of time enable shift signal ENGRAY is held active. In this embodiment, gray code shift register 260 can be written by the processor only if enable shift signal ENGRAY from burst sequencer 290 is low. Write gate qualifier address compare circuit 250 generates an active signal on line ADDCOMP only when enable shift signal ENGRAY is inactive.

Write gate control circuit 265 also receives a control input signal DSPWRTDIS from write gate disable bit in decoder control register DECCTL (See Table 20) within status and configuration registers 210 and a write gate disable signal on line WRTDIS from burst sequencer 290. Missing STM latch 280 also provides a missing STM input signal MISSING_STM to write gate control circuit 265. The write gate disable bit can be set by DSP 120 if at speed or on track conditions are not met.

In normal disk drive operation, the seven bits 14 to 8 in write gate disable drive fault register WRGTDF (Table 24) are set so that the signals on write safety mask bits line 1321 are such that write mask safety circuit 1320 passes therethrough the seven input signals, described above, on input lines 1335 to 1337 and lines MISSING_STM, ADDCOMP, WRTDIS, and DSPWRTDIS to NOR gate 1340. The output signal of NOR gate 1340 drives a first input terminal of AND gate 1350. The second input terminal of AND gate 1350 is driven by write gate signal WRTGT. The output terminal of AND gate 1350 drives qualified write gate line QWRTGT.

Hence, in normal operations, write gate control circuit 265 generates a qualified write gate signal on line QWRTGT in response to an active signal on line WRTGT only if all of the following conditions are satisfied: the write gate disable bit must be inactive; the signal on address compare line ADDCOMP must be active; the signal on line WRTDIS must be inactive; missing STM latch 280 must not be set; and the signals from shock latch 1308, AE write error latch 1311 and AE read error latch 1312 must not be active.

The safety mask bits in write gate drive fault register WRGTDF are provided for testing and diagnostics. Setting a safety mask bit permits generation of qualified write gate signal QWRTGT without intervention by the selected safety signal.

As shown in FIG. 13, with the exception of the signal driven by AE read enable latch 1312, each of the output lines from write mask safety circuit 1320 drives a first input terminal of an AND gate in AND gates 1341 to 1346. A second terminal of each of AND gates 1341 to 1346 is driven by the signal on write gate line WRTGT. The output terminal of each of AND gates 1341 to 1346 is connected to a bit in drive fault pending register 1351. The signal driven by AE read enable latch 1312 directly drives a bit in drive fault pending register 1351. Each of the bits in drive fault pending register 1351 is connected to a corresponding input line to drive fault mask safety circuit 1360. In this embodiment drive fault pending register 1351 is a 16-bit register and only the seven least significant bits are used. A bit in register 1351 is reset by DSP 120 writing a logic one to the location.

Bits 6 to 0 in write gate disable drive fault register WRGTDF are set so that the signals on drive fault mask bits line 1321 to drive fault mask safety circuit 1360 either blocks or passes therethrough the seven input signals to OR gate 1361. DSP 120 sets bits in drive fault register WRGTDF depending on whether a drive fault is desired when the corresponding safety signal blocks generation of a qualified write gate signal or when an AE read error occurs. Even if a bit is configured in write gate disable drive fault register WRGTDF so that a drive fault signal is not generated, DSP 120 can poll the bits in drive fault pending register 1351 to determine the drive fault status.

The output signal of OR gate 1361 drives an input terminal of three state buffer 1362. An active signal is generated to the input terminal of three state buffer 1362, if the generation of qualified write gate signal QWRTGT is blocked by one of the seven safety input signals. The output terminal of three state buffer 1362 drives pin DRVFLT and an input terminal of 5 three state buffer 1363. If a drive fault enable bit in decoder configuration register DECCFG (Table 18) is set, the signal on line CONFIG configures buffer 1362 so that the output signal of OR gate drives pin DRVFLT. Conversely, if drive fault enable bit is not set, a signal on pin DRVFLT is logically ORed with select A signal SELA from burst sequencer 290.

Figure 14:
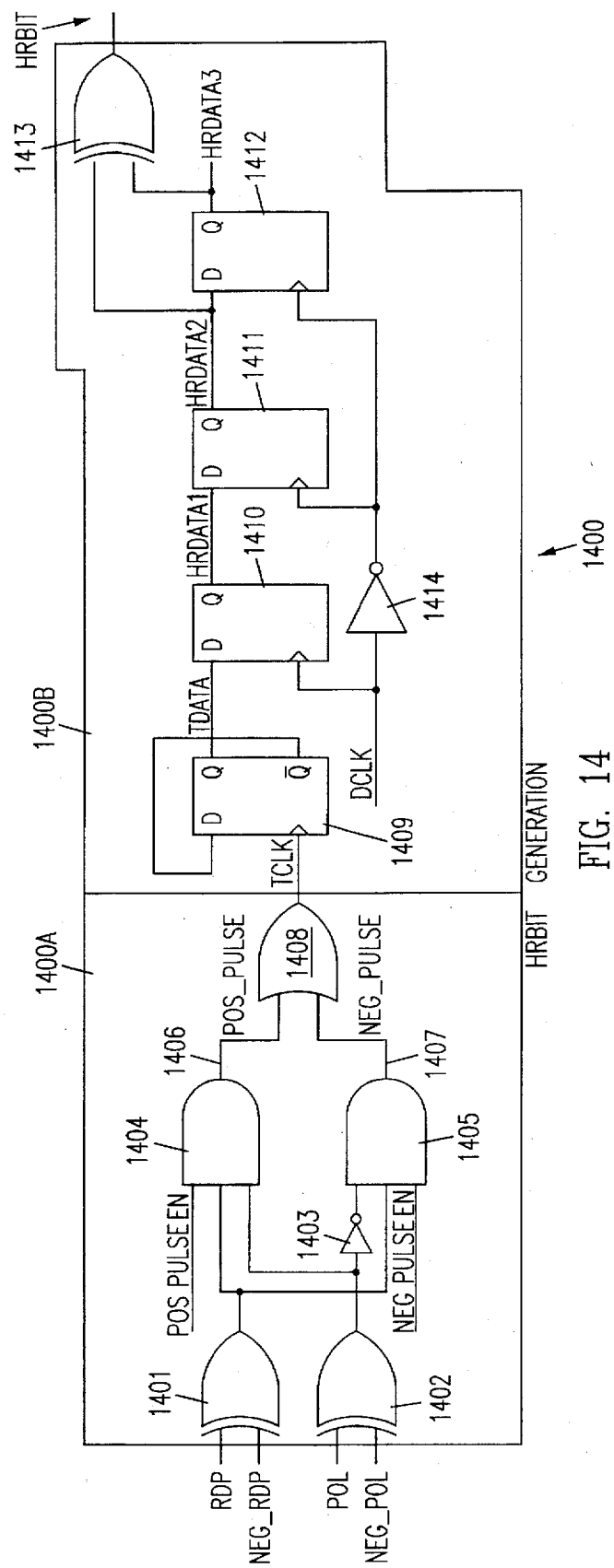
FIG. 14 is a more detailed diagram of one embodiment of a high resolution data bit generation of circuit of the data synchronizer of this invention that is used in the pulse mode of operation and by the timing mark sequencer.

FIG. 14 is a schematic diagram of a HRBIT generation circuit 1400 within data synchronizer circuit 275. Signal RDP from read channel integrated circuit 190 (FIG. 3A) is a first input signal to exclusive OR gate 1401. Negative RDP bit in decoder configuration register DECCFG (See Table 18) drives line NEG_RDP which in turn drives a second input terminal of exclusive OR gate 1401. Hence, exclusive OR gate 1401 is used to configure the active polarity for signal RDP. The output signal of exclusive OR gate 1401 drives a first input terminal of AND gate 1404 and a first input terminal of AND gate 1405.

Signal POL (FIG. 3A) from read channel integrated circuit 190 is a first input signal to exclusive OR gate 1402. Negative POL bit in decoder configuration register DEC-CFG (See Table 18) drives line NEG_POL which in turn drives a second input terminal of exclusive OR gate 1402. Hence, exclusive OR gate 1402 is used to configure the active polarity for signal POL. The output signal of exclusive OR gate 1402 drives a second input terminal of AND gate 1404 and an input terminal of inverter 1403 that in turn drives a second input terminal of AND gate 1405.

A third input terminal of AND gate 1404 is connected to a positive pulse enable line that in turn is coupled to positive pulse enable bit A and bit B in decoder configuration register DECCFG. A third input terminal of AND gate 1405 is connected to a negative pulse enable line that in turn is coupled to negative pulse enable bit A and bit B in decoder configuration register DECCFG.

An active output signal from AND gate 1404 on line 1406 represents a positive pulse and an active output signal from AND gate 1405 on line 1407 represents a negative pulse. OR gate 1408 generates an active signal on line TCLK whenever either the signal on line 1407 or the signal on line 1406 is active.

When the signal on line TCLK goes active, D-type flip-flop 1409 is clocked and the signal on output terminal/Q is applied to input terminal D. The output signal of flip-flop 1409 on line TDATA is applied to input terminal D of D-type flip-flop 1410.

Flip-flop 1410 is clocked by decode clock DCLK and the output signal of flip-flop 1410 drives line HRDATA1 that is connected to input terminal D of D-type flip-flop 1411. The signal on input terminal D of flip-flop 1411 is loaded into flip-flop 1411 by a rising edge from inverter 1414 that is driven by decode clock DCLK.

The output signal of flip-flop 1411 drives line HRDATA2 that is connected to input terminal D of D-type flip-flop 1412 and to a first input terminal of exclusive OR gate 1413. The signal on input terminal D of flip-flop 1412 is loaded into flip-flop 1412 by a rising edge from inverter 1414. The output signal of flip-flop 1412 on line HRDATA3 drives a second input terminal of exclusive OR gate 1413. The output signal of exclusive OR gate 1413 drives line HRBIT. HRBIT generation circuit 1400 is operational for both modes of operation of data synchronizer 275.

Figure 15D:
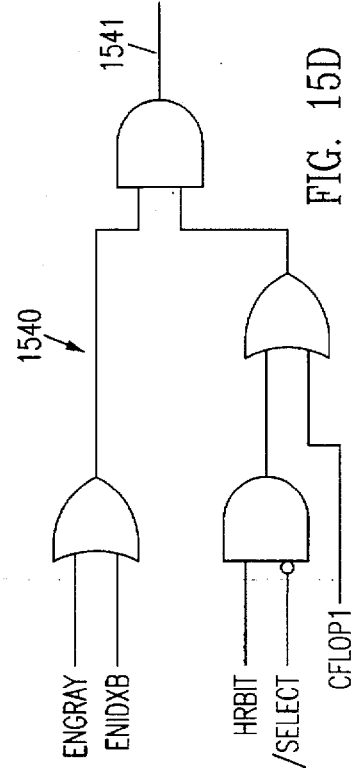
Figure 15C:
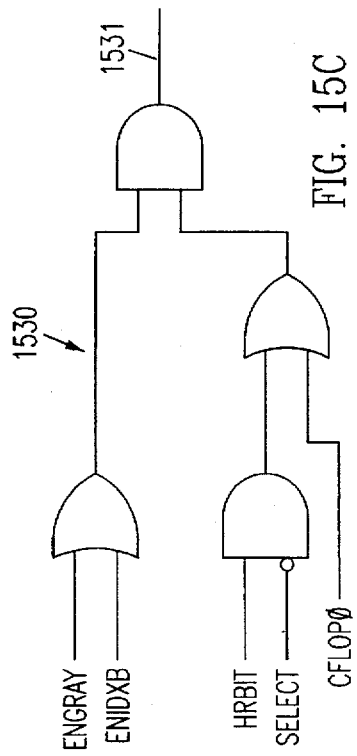

FIGS. 15A to 15D are a schematic diagram of a pulse DBIT generation circuit 1500 within data synchronizer circuit 275 that is utilized when data synchronizer circuit 275 is in mode 0, i.e., the pulse mode. FIG. 15A is a pulse cell clock generation circuit 1510 of pulse DBIT generation circuit 1500 and FIG. 15B is a schematic diagram of a pulse DBIT circuit 1550.

In pulse cell clock generation circuit 1510, clock count bus 1501, a four bit bus in this embodiment, is driven by a signals from programmable clock divider circuit 220 that define the cell time from the signal on line DBIT. The signals on clock count bus 1501 are loaded into a four bit counter 1502 that is decremented by decode clock DCLK, i.e., the value of counter 1502 is changed by each clock tick of decode clock DCLK.

The output signal of counter 1502 is provided by line CCOUNT to comparator 1503, which in this embodiment is a logic gate that performs a compare function. When the output signal of counter 1502 is one, comparator 1503 applies an active signal to input terminal D of D-type flip-flop 1504 for one clock period of decode clock DCLK, and otherwise the signal on input terminal D is inactive. D-type flip-flops 1504, 1508, and 1509 are clocked by decode clock DCLK.

Upon loading of the active signal on input terminal D into flip-flop 1504, the signal on early cell clock line 1505 and input terminal D of flip-flop 1508 is driven active. Upon loading of the active signal on input terminal D into flip-flop 1508, the signal on pulse cell clock line 1511 and input terminal D of flip-flop 1509 is driven active and the input signal to flip-flop 1504 goes inactive. In mode 0 operation, the signal on pulse cell clock line 1511 is passed through a multiplexer to line CCLK of data synchronizer circuit 275. Upon loading of the active signal on input terminal D into flip-flop 1509, the signal on late cell clock line 1507 is driven active.

The rising edge of the active signal on early cell clock line 1505 loads the signal on terminal/Q of D-type flip-flop 1520 into flip-flop 1520 in circuit 1550. The signal on terminal Q of flip-flop 1520 drives line SELECT that in turn drives an input terminal of logic circuit 1530 while the signal on terminal/Q of flip-flop 1520 drives a line/SELECT that in turn drives an input terminal of logic circuit 1540. Line HRBIT from HRBIT generation circuit 1400 and lines ENGRAY and ENIDXB from burst sequencer 290 also provide input signals to logic circuits 1530 and 1540.

Output line 1531 of logic circuit 1530 is connected to input terminal D of D-type flip-flop 1521 that is clocked by decode clock DCLK. Output terminal Q of flip-flop 1521 drives feedback line CFLOP0 to logic circuit 1530 and a first input terminal of multiplexer 1540.

Output line 1541 of logic circuit 1540 is connected to input terminal D of D-type flip-flop 1522 that is clocked by decode clock DCLK. Output terminal Q of flip-flop 1522 drives feedback line CFLOP1 to logic circuit 1540 and a second input terminal of multiplexer 1540.

Thus, all of the input signals to logic circuit 1530 and 1540 have been defined. Logic circuit 1530 (FIG. 15C) implements the following function:

1531=(ENGRAY OR ENIDXB) AND ((HRBIT AND /SELECT) OR CFLOP0).

Logic circuit 1540 (FIG. 15D) implements the following function:

1541=(ENGRAY OR ENIDXB) AND ((HRBIT AND SELECT) OR CFLOP1)

The rising edge on late cell clock line 1507 loads the signal on terminal/Q into D-type flip-flop 1523. The signal on terminal Q drives input select terminal SEL of multiplexer 1540. When the signal on terminal SEL is inactive, the signal on input terminal A is passed therethrough to pulse DBIT line 1541. Conversely, when the signal on terminal SEL is active, the signal on input terminal B is passed therethrough to pulse DBIT line 1541. In mode 0, the signal on line 1541 drives a signal onto line DBIT.

FIGS. 16A, 16B and 16C are a schematic diagram of a phase mode DBIT generation circuit 1600 within data synchronizer circuit 275 that is utilized when data synchronizer circuit 275 is in mode 1, i.e., the phase mode. FIG. 16A is schematic diagram of a phase DBIT circuit 1610 in circuit 1600. FIG. 16B is a schematic diagram of a shift clock generation circuit 1620 that drives shift clock line of phase DBIT circuit 1610 and FIG. 16C is a schematic diagram of phase cell clock circuit 1630.

In phase DBIT circuit 1610, negative pulse line 1407 and positive pulse line 1406 are the same lines as in FIG. 14. The signal on negative pulse line 1407 drives active low set terminal S of flip-flop 1601 and the signal on positive pulse line 1406 drives active low reset terminal R of flip-flop 1601. Output terminal Q of flip-flop 1601 drives input terminal D of D-type flip-flop 1602 that is clocked by shift clock signal on line 1603. Output terminal Q of flip-flop 1602 drives phase DBIT output line 1604 which in turn drives a signal on line DBIT in mode 1.

In shift clock generation circuit 1620, clock PCLK clocks 16-bit positive shift register 1621 and negative edge first D-type flip-flop 1633 and drives an input terminal of inverter 1640. The output signal of inverter 1640 clocks 16-bit negative shift register 1631 and positive edge first D-type flip-flop 1623. The input terminal of positive shift register 1621 and negative shift register 1631 are connected to a logic one signal.

A least significant bit, POS[0], of positive shift register 1621 drives a first input terminal of AND gate 1622. A least significant bit, NEG[0], of negative shift register 1631 drives an input terminal of inverter 1624 that in turn drives a second input terminal of AND gate 1622. The signal on the output terminal of AND gate 1622 drives input terminal D of positive edge first flip-flop 1623. Output terminal Q of flip-flop 1623 drives positive edge first line 1652 to logic circuit 1660.

The least significant bit, NEG[0], of negative shift register 1631 also drives a first input terminal of AND gate 1632. The least significant bit, POS[0], of positive shift register 1621 also drives an input terminal of inverter 1634 that in turn drives a second input terminal of AND gate 1632. The signal on the output terminal of AND gate 1632 drives input terminal D of negative edge first flip-flop 1633. Output terminal Q of flip-flop 1633 drives negative edge first line 1654 to logic circuit 1660.

Each of the 16-bits in positive shift register 1621 drives an input line of positive edge multiplexer 1625. Similarly, each of the 16-bits in negative shift register 1632 drives an input line of negative edge multiplexer 1635. Positive edge mux output line 1651 and negative edge mux output line 1655 are both input lines to logic circuit 1660. The shift register bit signal passed through multiplexers 1625 and 1635 is determined by bits 4 to 1 of the half cell count that are defined by bits 14 to 11 of decoder control register DECCTL. The least significant bit of the half cell count HALF CELL COUNT [0], that is defined by bit 10 of decoder control register DECCTL, drives input line 1653 to logic circuit 1660. Logic circuit 1660 implements the following function where the numbers 1651 to 1655 are the reference numerals for lines and in this case represent a signal level on the line in FIG. 16B:

1603=(1652 AND 1653 AND 1655) OR
(1652 AND/1653 AND 1651) OR
(1654 AND 1653 AND 1651) OR
(1654 AND/1653 AND 1655).

To demonstrate the function of shift clock generation circuit 1620 assume that the half cell counter is initially loaded with 00100, i.e., four and that a positive rising edge of clock PCLK occurs first. Thus, circuit 1620 is looking for the fifth edge of clock PCLK. On the first rising edge of clock PCLK, Positive shift register=0000000000000001;
Negative shift register=0000000000000000;
Positive edge first line=0;
Negative edge first line=0;
Half cell count bit 0=0;
Half cell count bits [4:1]=0010; and
Shift clock=0.

On the first falling edge of clock PCLK,
Positive shift register=0000000000000001;
Negative shift register=0000000000000001;
Positive edge first line=1;
Negative edge first line=0;
Half cell count bit 0=0;
Half cell count bits [4:1]=0010; and
Shift clock=0.

On the second rising edge of clock PCLK,
Positive shift register=0000000000000011;
Negative shift register=0000000000000001;
Positive edge first line=1;
Negative edge first line=0;
Half cell count bit 0=0;
Half cell count bits [4:1]=0010; and
Shift clock=0.

On the second falling edge of clock PCLK,
Positive shift register=0000000000000011;
Negative shift register=0000000000000011;
Positive edge first line=1;
Negative edge first line=0;
Half cell count bit 0=0;
Half cell count bits [4:1]=0010; and Shift clock=0.
On the third rising edge of clock PCLK,
Positive shift register =0000000000000111;
Negative shift register=0000000000000011;
Positive edge first line=1;
Negative edge first line=0;
Half cell count bit 0=0;
Half cell count bits [4:1]=0010; and
Shift clock=1.

Since the half cell count selects bit 2 of positive and negative shift registers 1621 and 1631, on the third rising edge, the signal on line 1651 goes active. The signal on line 1652 is active and the complement of the signal on line 1653 is an active signal and consequently the shift clock signal on line 1603 goes active and clocks the signal from flip-flop 1601 into flip-flop 1602.

In FIG. 16C, in phase cell clock circuit 1630, the signal on line 1407 drives an input terminal of inverter 1606 and the output terminal of inverter drives phase cell clock line 1605 which in turn drives a signal onto cell clock line CCLK in mode 1.

Figure 17:
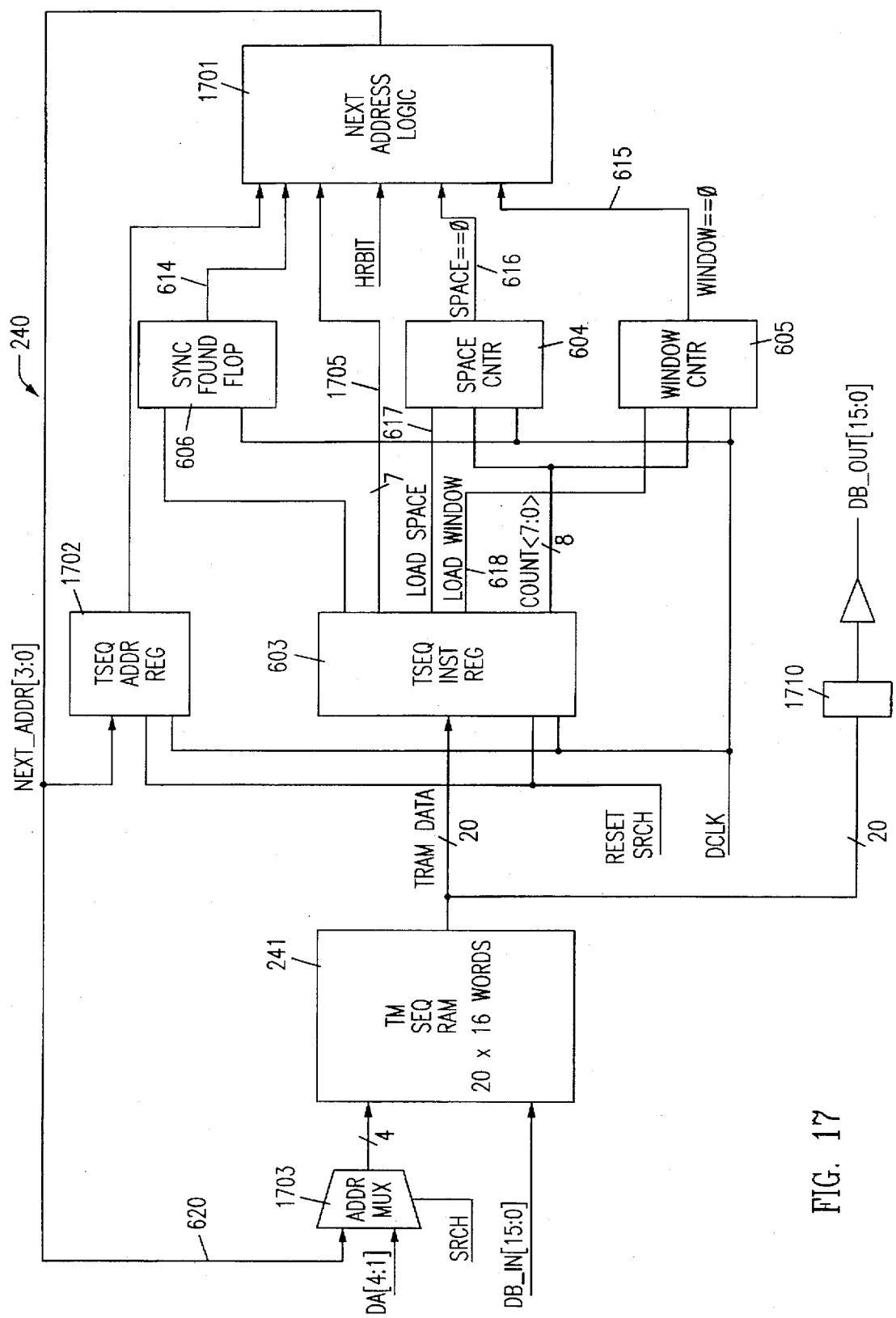
FIG. 17 is a more detailed block diagram of the programmable timing mark sequencer of this invention.

FIG. 17 is a more detailed diagram of timing mark sequencer 240. DSP data in bus DB_IN[15:0] is connected to sequencer RAM 241. Address multiplexer 1703 receives a four bit address from next address logic circuit 1701 and DSP address bus bits four to one. The address passed through address multiplexer 1703 is determined by the state of signal SRCH. If signal SRCH is inactive, the address from the DSP address bus is applied to sequencer RAM 241 and conversely, if signal SRCH is active, the address from next address logic circuit 1701 is applied to sequencer RAM 241.

When signal SRCH is inactive, timing sequencer address register 1702 and instruction register 603 are held in reset. Thus, DSP 120 can load sequencer RAM 241 without timing mark sequencer 240 processing the instructions as they are loaded.

The instruction in the location pointed to by the four bit address from address multiplexer 1703 is applied over 20-bit bus TRAM_DATA to instruction register 603 and to logic circuit 1710 that in turn drives DSP output data bus DB_OUT[15:0]. When signal SRCH goes active, instruction register 603 is taken out of reset and the next rising edge of decode clock DCLK loads the instruction on bus TRAM_DATA into instruction register 603.

Figure 6:
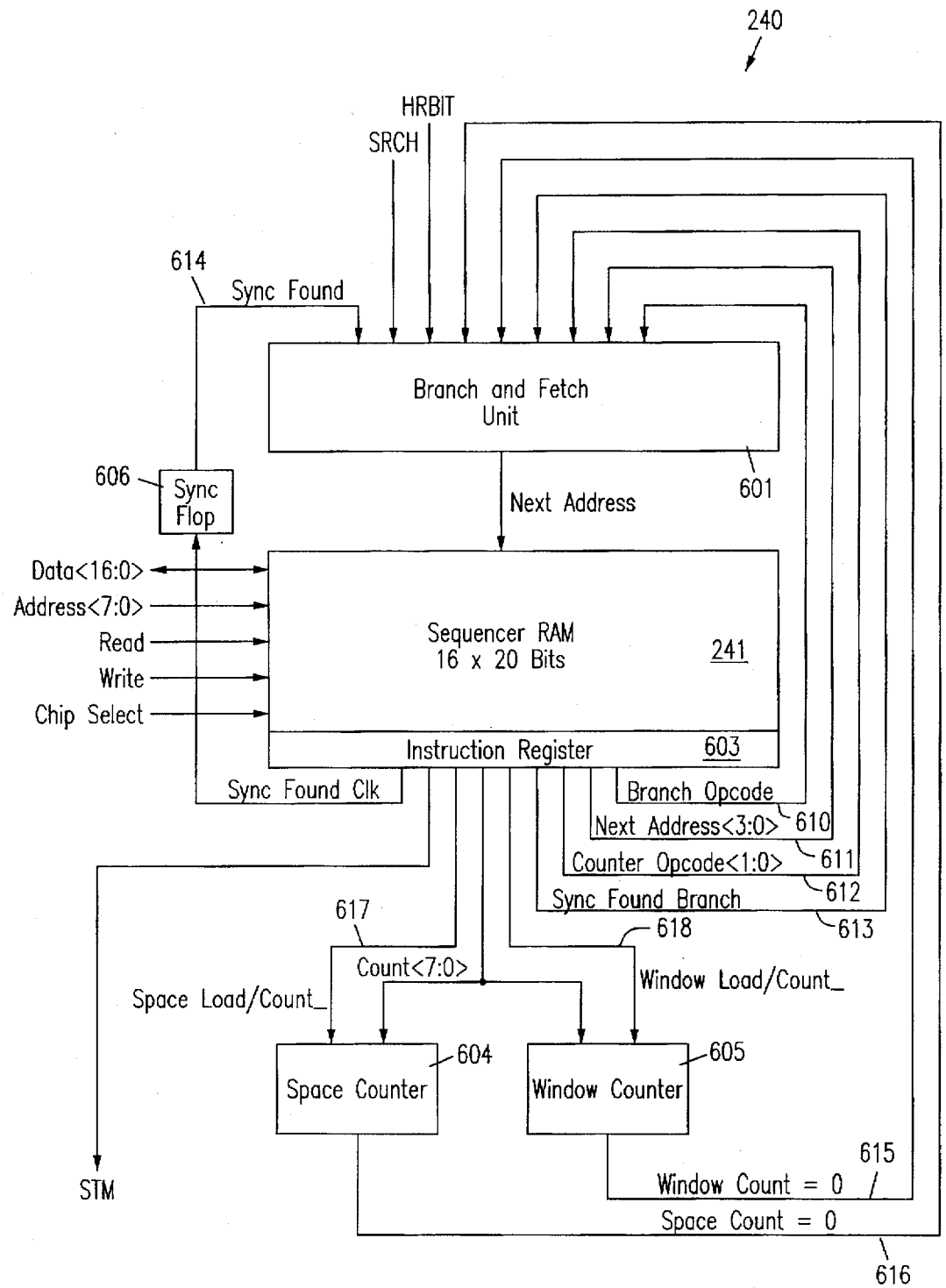
FIG. 6 is a detailed block diagram of the programmable timing mark sequencer of this invention.

The output signals from instruction register 603 were described above with respect to FIG. 6 and that description is incorporated herein by reference. In FIG. 17, bus 1705 represents lines 610 to 613 in FIG. 6. Thus, the branch op code, next address<3:0>, counter op code <1:0> and sync found branch field of the instruction in instruction register 603 are applied to next logic address circuit 1701. Next address logic 1701 also receives as input signals the address in sequencer address register 1702, the sync found signal on line 614, high resolution data bit HRBIT, and the signals on line window counter zero line 615 and space counter zero line 616.

Based on the state of the various input signals, next address logic circuit 1701 generates the address for the next instruction to be executed and sends that address to address multiplexer 1703 and sequencer address register 1702. The operations in next address logic circuit 1701 are defined by the various relationships defined above in the definition of the various meanings of the bits in a timing mark sequencer instruction in TABLE 1.

Figure 18:
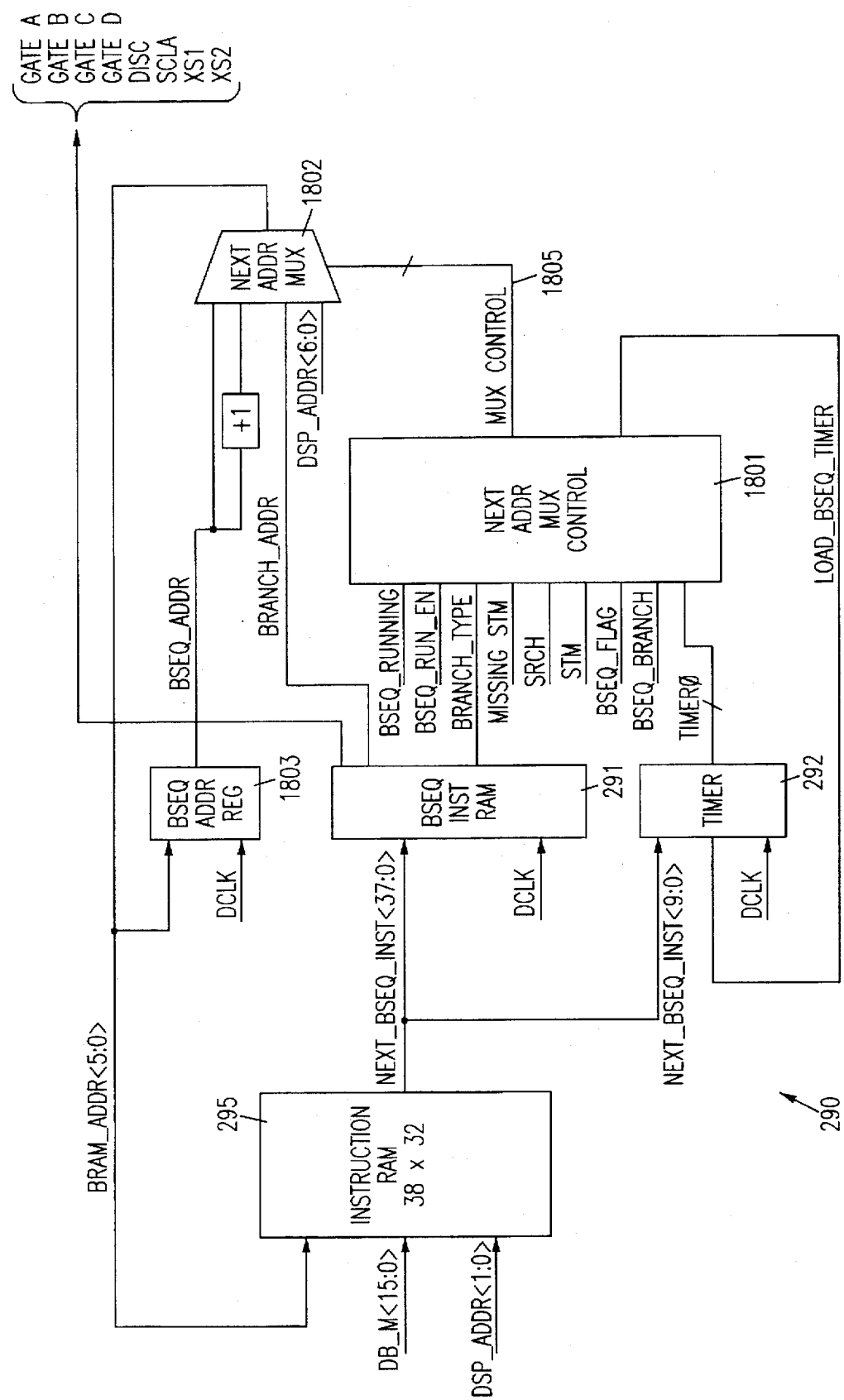
FIG. 18 is a more detailed block diagram of the programmable servo burst sequencer of this invention.

FIG. 18 is a detailed diagram of programmable burst sequencer 290 of this invention. Instruction RAM 295 receives a five bit address on bus BRAM_ADR<4:0> from next address multiplexer 1802 and a two bit address from DSP address bus bits 1 and 0. DSP data in bus <15:0> is used by DSP 120 to load instructions into instruction RAM 295, as described above. Bus INST in FIG. 2 is the same as 38-bit bus NEXT_BSEQ_INST that provides the instruction addressed by the address on bus BRAM_ADR<4:0> to instruction register 291. The least significant 10 bits of bus NEXT_BSEQ_INST provide the timer load value bits in the address instruction to timer 292.

Bits 31 to 24 of the instruction in register 291 drive the input lines to gate multiplexer 285 as previously described. Branch address bits, bits 14 to 10, of the instruction in register 291 drive bus BRANCH_ADDR to next address multiplexer 1802, i.e., are a first input address to multiplexer 1802. Bits 6 to 2 of the DSP address bus are a second input address to multiplexer 1802. The address on bus BSEQ_ADDR from address register 1803 is a third input address to multiplexer 1802. A fourth input address to multiplexer 1802 is the address on bus BSEQ_ADDR plus one. The address passed through next address multiplexer 1802 to five-bit bus BRAM_ADDR <4:0> is determined by the signals on mux control lines 1805 from next address mux control circuit 1801.

The state of the input signal on line BSEQ_RUN_EN is determined by burst sequencer run enable bit in decoder control register DECCTL, that is described below. When the signal on line BSEQ_RUN_EN is inactive, i.e., low in this embodiment, the output signals of register 291 are all low and circuit 1801 drives signals on mux control lines 1805 to select the address on DSP address bus bits 6 to 2 so that DSP 120 can load instructions into instruction RAM 295. An active signal is supplied to next address mux control circuit 1801 on line BSEQ_RUNNING one clock cycle of decode clock DCLK after the signal on line BSEQ_RUN_EN goes active.

The other input signals to next address mux control circuit 1801 are the signals on lines STM, SRCH, MISSING_STM and TIMER0, that were described above. Branch type bits 18 to 16 in register 291 are applied over bus BRANCH_TYPE to circuit 1801. The state of the input signal on line BSEQ_BRANCH is determined by the state of the burst branch bit in decoder control register DECCTL. The state of the input signal on BSEQ_FLAG bit is determined by the decoder flag bit (bit 12) in decoder status register DECSTA.

The address selected for passing through multiplexer 1802 is defined by the discussion of the burst sequencer instruction with respect to TABLE 3 above. The address on bus BRAM_ADDR<4:0> is loaded in address register 1803 and applied to instruction RAM 295. Next address mux control circuit 1801 also generates a signal on line LOAD_BSEQ_TIMER to load timer 292.

Figure 19:
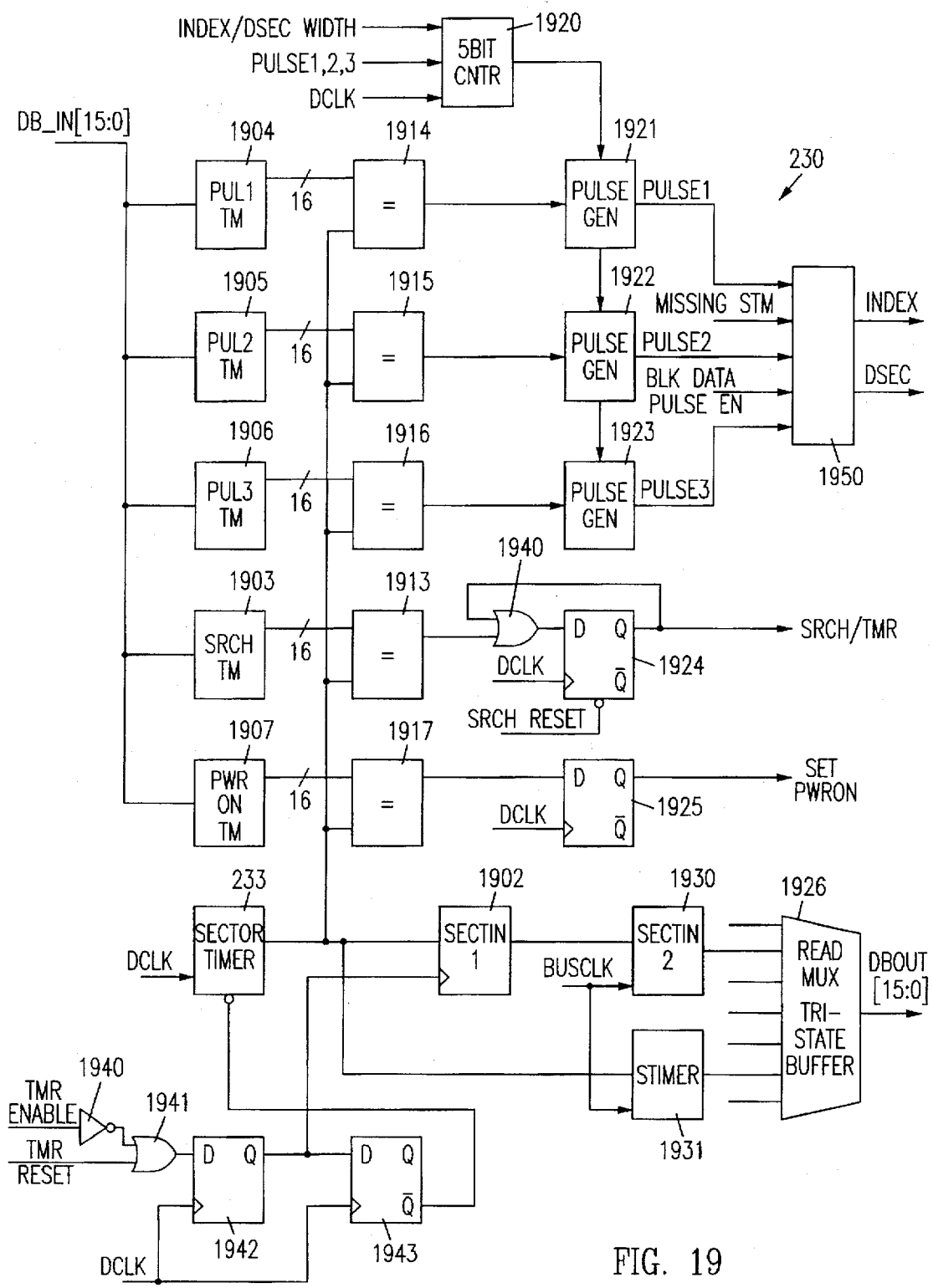
FIG. 19 is a more detailed block diagram of the servo timing control circuit of this invention.

FIG. 19 is a more detailed block diagram of servo timing control circuit 230. In this embodiment, timing registers 232 includes sector time register 1902, search window time register 1903, data sector pulse 1 time register 1904, data sector pulse 2 time register 1905, data sector pulse 3 time register 1906, and power on time register 1907.

Servo sector timer 233 is a 16-bit up counter that is clocked by clock DCLK. The output signal of servo sector timer 233 is supplied to comparators 1913 to 1917 and to sector time register 1902. The output signal of servo sector timer 233 is also supplied to servo timer register 1931 that is clocked by the DSP bus clock BUSCLK and so servo timer register 1931 contains the present value of servo sector timer 233. The output signal of servo timer register 1931 can be passed through read multiplexer 1926 by DSP 120 to DSP data out bus DB_OUT[15:0].

The sector timer enable bit in decoder control register DECCTL drives inverter 1940. If the sector timer enable bit is set, sector timer 233 can run. If the sector timer enable bit is not set, sector timer 233 is held in reset. Specifically, the output signal of inverter 1940 drives a first input terminal of OR gate 1941. The signal on line RST_TIMER from burst sequencer 290 drives a second input terminal of OR gate 1941.

When both input signals to OR gate 1941 are low, a logic zero is clocked into D-type flip-flop 1942 by each rising edge on decode clock line DCLK. The signal on output terminal Q drives input terminal D of D-type flip-flop 1943 that is also clocked by decode clock DCLK and clock terminal CLK of register 1902. Thus, the logic zero is also loaded into flip-flop 1943.

Output terminal/Q of flip-flop 1943 is connected to the active low reset terminal of sector timer 233. Thus, so long as the output signal of OR gate 1941 is low, sector timer 233 is not reset. When the output signal of OR gate 1941 goes high, the next rising edge of decode clock DCLK loads the logic one into flip-flop 1942 and the rising edge on the output terminal of flip-flop 1942 loads the value of sector timer 233 into register 1902. Register 1930 is a synchronization register that receives the output signal of register 1902 and is clocked by bus clock BUSCLK. The second rising edge of decode clock DCLK after the output signal of OR gate goes active resets sector timer 233.

As explained above, sixteen bit search window time register 1903 contains a value that is compared to the value of servo sector timer 233 by a comparator 1913. A minimum value of 0x0002 is required in search window time register 1903. Writing 0x0000 to search window time register 1903 disables this function.

When the value in search window time register 1903 and the value of servo sector timer 233 are equal, comparator 1913 generates an active signal on a first input terminal of OR gate 1940. A second input terminal is connected to terminal Q of D-type flip-flop 1924. The output terminal of OR gate 1940 is connected to input terminal D of flip-flop 1924. Thus, when the output signal from comparator 1913 goes active, the output signal of D-type flip-flop 1924 remains active until flip-flop 1924 is reset. Search signal reset line RESET_SRCH from burst sequencer 290 drives an inverter (not shown) which in turn drives line SRCH_RESET that is connected to the active low reset terminal of flip-flop 1924. Thus, when the output signal of flip-flop 1924 goes active, the output signal remains active until flip-flop 1924 is reset by burst sequencer 290.

Output line SRCHTMR from flip-flop 1924 drives a first input terminal of an OR gate (not shown). A second input terminal of the OR gate is driven by the open search window bit in decoder control register DECCTL. (See Table 20.) The output terminal of the OR gate drives search signal line SRCH. Thus, either DSP 120 or servo timing control circuit 230 can drive signal SRCH active.

Data sector pulse 1 time register 1904 contains a value equal to the number of cycles of clock DCLK after the resetting of servo sector timer 233 that a first data sector pulse is generated by sector/index pulse generator 231. The value in sixteen bit data sector pulse 1 time register 1904 is compared to the value of servo sector timer 233 by a comparator 1914. When the two values are equal, comparator 1914 generates an active signal to pulse generator circuit 1921 that in turn drives the signal on line PULSE1 active. The active signal on line PULSE1 enables 5-bit counter 1920 that was loaded with the value of the INDEX/DSEC pulse width bits times four and each subsequent positive edge on line DCLK decrements counter 1920. When counter 1920 reaches a value of zero, pulse generator circuit 1921 is reset so that signal on line PULSE1 goes low and counter 1920 is reloaded.

The signal on line PULSE1 drives an input terminal of logic circuit 1950. Line MISSING_STM from missing STM latch 280 drives another input terminal of logic circuit 1950. The block data pulse enable bit in decoder configuration register DECCFG drives yet another input terminal of logic circuit 1950 and index enable bit of decoder control register DECCTL another input terminal.

If block data pulse enable bit is set, no output pulse is generated by logic circuit 1950 on either output line INDEX or output line DSEC in response to the active signal on line PULSE1 if the signal on line MISSING_STM is active. If only the index enable bit is set and the active signal on line PULSE1 is the first data sector pulse in the track, logic circuit 1950 generates a pulse on line INDEX and otherwise a pulse on data sector pulse line DSEC.

A minimum value of 0x0002 is required to be loaded in data sector pulse 1 time register 1904 by DSP 120. Writing 0x0000 to this register disables this function.

Data sector pulse 2 time register contains 1905 a value equal to the number of cycles of clock DCLK after the resetting of servo sector timer 233 that a second sector pulse is generated by sector/index pulse generator 231. The value in sixteen bit data sector pulse 2 time register 1905 is compared to the value of servo sector timer 233 by a comparator 1915. When the two values are equal, comparator 1915 generates an active signal to pulse generator circuit 1922. In response to the active signal from comparator 1915, a pulse is generated on line PULSE2 by pulse generator circuit 1922. The active signal on line PULSE2 enables 5-bit counter 1920 that was loaded with the value of the INDEX/DSEC pulse width bits times four and each subsequent positive edge on line DCLK decrements counter 1920. When counter 1920 reaches a value of zero, pulse generator circuit 1921 is reset so that signal on line PULSE2 goes low and counter 1920 is reloaded. If only the signal on line PULSE2 to logic circuit 1950 is active, logic circuit 1950 generates a data sector pulse on line DSEC. The operation of logic circuit 1950 in response to active signal PULSE2 is the same as the response to active signal PULSE1, that was described above, except a pulse cannot be generated on line INDEX in response to active signal PULSE2.

A minimum value of 0x0002 is required to be loaded in data sector pulse 2 time register 1905 by DSP 120. Writing 0x0000 to this register disables this function.

Data sector pulse 3 time register contains 1906 a value equal to the number of cycles of clock DCLK after the resetting of servo sector timer 233 that a second sector pulse is generated by sector/index pulse generator 231. The value in sixteen bit data sector pulse 3 time register 1906 is compared to the value of servo sector timer 233 by a comparator 1916. When the two values are equal, comparator 1916 generates an active signal to pulse generator circuit 1923. In response to the active signal from comparator 1916, a pulse is generated on line PULSE3 by pulse generator circuit 1923. The active signal on line PULSE3 enables 5-bit counter 1920 that was loaded with the value of the INDEX/DSEC pulse width bits times four and each subsequent positive edge on line DCLK decrements counter 1920. When counter 1920 reaches a value of zero, pulse generator circuit 1923 is reset so that signal on line PULSE2 goes low and counter 1920 is reloaded. If only the signal on line PULSE3 to logic circuit 1950 is active, logic circuit 1950 generates a data sector pulse on line DSEC. The operation of logic circuit 1950 in response to active signal PULSE3 is the same as the response to active signal PULSE1, that was described above, except a pulse cannot be generated on line INDEX in response to active signal PULSE3.

A minimum value of 0x0002 is required to be loaded in data sector pulse 3 time register 1906 by DSP 120. Writing 0x0000 to this register disables this function.

Power on time register 1907 contains a value equal to the number of cycles of clock DCLK after the resetting of servo sector timer 233 that a power on pulse SETPON is sent to a power management system and an interrupt may be generated. This permits power management so that the electronics are powered for the servo bursts. The value in sixteen-bit power on time register 1907 is compared to the value of servo sector timer 233 by a comparator 1917. When the two values are equal, comparator 1917 generates an active signal to input terminal D of D-type flip-flop 1925. The next rising edge of decode clock DCLK drives an active signal on line SETPON. A minimum value of 0x0002 is required to be loaded in power on time register 1907 by DSP 120. Writing 0x0000 to this register disables this function.

In the above disclosure reference was made to some registers and bits within status and configuration registers 210. The various registers included within status and configuration registers 210 and the bit configuration of each register is described below. The configuration of programmable servo burst decoder 130 is setup during initialization by DSP 120 writing to decoder configuration register DEC-CFG. Decoder control register DECCTL is used to control and input information to programmable servo burst decoder 130. Decoder status register DECSTA is read by DSP 120 to obtain information from programmable servo burst decoder 130. The gate, discharge, and select pins that are normally controlled by burst sequencer 290 can be controlled directly by the DSP 120 by setting bits in gating configuration register GTECFG.

One embodiment of decoder configuration register DEC-CFG is given in Table 18.

TABLE 18

| DECODER CONFIGURATION REGISTER (DECCFG) | | | |
|---|---|---|---|
| Bit(s) | rw | Reset | Name |
| 15 | rw | 0 | Detection Mode B. |
| 14 | rw | 0 | Detection Mode A. |
| 13 | rw | 0 | Negative POL. |
| 12 | rw | 0 | Negative RDP. |
| 11 | rw | 0 | Shock Sensor Pin Mode Select. |
| 10 | rw | 0 | Negative SHKSNS. |
| 09 | rw | 0 | DRVFLT pin Enable. |
| 08 | rw | 0 | Block Data Pulse Enable. |
| 07:05 | rw | 0...0 | INDEX/DSEC pulse width. |
| 04 | rw | 0 | Reserved. |
| 03 | rw | 0 | Positive Pulse Enable B. |
| 02 | rw | 0 | Negative Pulse Enable B. |
| 01 | rw | 0 | Positive Pulse Enable A. |
| 00 | rw | 0 | Negative Pulse Enable A. |

The state of the detection mode B bit in register DECCFG defines the detection mode used by data synchronizer 275 when servo sector signal SSEC is active. If this bit is not set, data synchronizer 275 operates in mode 0, the pulse detection mode. Conversely, if this bit is set, data synchronizer 275 operates in the phase detection mode, mode 1.

The state of the detection mode A bit in register DECCFG defines the detection mode used by data synchronizer 275 when servo sector signal SSEC is inactive. If this bit is not set, data synchronizer operates in mode 0, the pulse detection mode. Conversely, if this bit is set, data synchronizer 275 operates in the phase detection mode, mode 1.

Negative POL bit defines the active state of the input signal POL to data synchronizer 275 as being a low level when this bit is set. See exclusive OR gate 1402 (FIG. 14) When bit negative POL is set, a low signal level on line POL indicates a positive pulse. Conversely, if bit negative POL is not set, a high level on line POL indicates a positive pulse.

Negative RDP bit defines the active state of the input signal RDP to data synchronizer 275. See exclusive OR gate 1401 (FIG. 14) A negative edge of input signal RDP indicates a pulse if this bit is set. A positive edge of input signal RDP indicates a pulse if this bit is not set.

The shock sensor pin mode select bit is used to define the state of logic analog/digital select switch 1301 (FIG. 13) When shock sensor pin mode select bit is set, the signal on pin SHKSNS is processed as an analog signal and otherwise as a digital signal whose active level is defined by negative SHKSNS bit.

The negative SHKSNS bit is used in polarity select circuit 1305 to define the active state of the signal on pin SHKSNS when the shock sensor pin mode select bit is inactive. When negative SHKSNS bit is set, the signal on pin SHKSNS is active low and conversely.

The DRVFLT pin enable bit drives line CONFIG in FIG. 13. If DRVFLT pin enable bit is set, pin DRVFLT is driven by the drive fault signal from OR gate 1361. If DRVFLT pin enable bit is not set, pin DRVFLT is an input pin and the input signal on pin DRVFLT is logically OR'ed with the signal on line SELA from burst sequencer 290.

Block data pulse enable bit is set to prevent generation of index and data sector pulses by sector/index pulse generator circuit 231 on lines INDEX and DSEC respectively in sectors that have missing STM latch 280 set. See logic circuit 1950 (FIG. 19).

INDEX/DSEC pulse width bits define the pulse width of index and data sector signals. See FIGS. 2 and 19. Specifically, the pulse width is the period of decode clock DCLK multiplied by the value in INDEX/SEC pulse width bits multiplied by four plus one. Thus, in this embodiment, the maximum pulse width is twenty eight times the period of decode clock DCLK plus one. A zero value in these bits disables sector/index pulse generator circuit 231.

When positive pulse enable bit B is set and servo sector signal SSEC is active, data synchronizer 275 decodes positive pulses as data bits. Conversely, when negative pulse enable bit B is set and servo sector signal SSEC is active, data synchronizer 275 decodes negative pulses as data bits.

When positive pulse enable bit A is set and servo sector signal SSEC is inactive, data synchronizer 275 decodes positive pulses as data bits. Conversely, when negative pulse enable bit A is set and servo sector signal SSEC is inactive, data synchronizer 275 decodes negative pulses as data bits.

Table 19 is one embodiment of gating configuration register GTECFG.

TABLE 19

| GATING CONFIGURATION REGISTER (GTECFG) | | | |
|---|---|---|---|
| Bit(s) | rw | Reset | Description |
| 15 | rw | 0 | Gate A Aux. Enable. |
| 14 | rw | 0 | Gate B Aux. Enable. |
| 13 | rw | 0 | Gate C Aux. Enable. |
| 12 | rw | 0 | Gate D Aux. Enable. |
| 11 | rw | 0 | Discharge Aux. Enable. |
| 10 | rw | 0 | Select A Aux. Enable. |
| 09 | rw | 0 | Extra Select 2 Aux. Enable. |
| 08 | rw | 0 | Extra Select 1 Aux. Enable. |
| 07 | rw | 0 | Gate A Aux. |
| 06 | rw | 0 | Gate B Aux. |

TABLE 19-continued

GATING CONFIGURATION REGISTER (GTECFG)

| Bit(s) | rw | Reset | Description |
|---|---|---|---|
| 05 | rw | 0 | Gate C Aux. |
| 04 | rw | 0 | Gate D Aux. |
| 03 | rw | 0 | Discharge Aux. |
| 02 | rw | 0 | Select A Aux. |
| 01 | rw | 0 | Extra Select 2 Aux. |
| 00 | rw | 0 | Extra Select 1 Aux. |

Gating configuration register GTECFG allows independent control of pins GTA, GTB, GTC, GTD, DISC, SELA, XS1 and XS2. Bits 15 to 8 of gating configuration register GTECFG determine whether DSP 120 or burst sequencer 290 controls the signal on these pins. If a bit is set in bits 15 to 8, DSP 120 controls the signal on the pin corresponding to the set bit by setting or clearing the appropriate bit in bits 7 to 0 of gating configuration register GTECFG. If a bit is clear in bits 15 to 8, burst sequencer 290 controls the signal on the pin corresponding to the clear bit.

Table 20 presents on embodiment of decoder control register DECCTL.

TABLE 20

DECODER CONTROL REGISTER (DECCTL)

| Bit(s) | rw | Reset | Description |
|---|---|---|---|
| 15 | w | 0 | Reset Index. |
| 14:10 | rw | 0000 | Half Cell Count. |
| 09:07 | rw | 000 | SRCH pin Signal Output Select. |
| 06 | rw | 0 | Index Enable. |
| 05 | w | 0 | Reset Missing STM. |
| 04 | rw | 0 | Open Search Window. |
| 03 | rw | 0 | Sector Timer Enable. |
| 02 | rw | 0 | Burst Branch. |
| 01 | rw | 0 | Write Disable |
| 00 | rw | 0 | Burst Sequencer Run Enable. |

When DSP 120 sets reset index bit, index bit latch is reset.

The binary value of the half cell count bits are loaded into a half cell counter in data synchronizer 275 at the beginning of a bit cell when data synchronizer 275 is in mode 1. The binary value of the half cell count bits defines the location of the center of the bit cell. The binary value plus one is the number of clock PCLK half-cycles from the trailing edge of positive pulse RDP to the center of the bit cell.

In one embodiment a number of different signals can be coupled to output pin SRCH. The signal applied to output pin SRCH is determined by the three SRCH pin signal output select bits which drives a multiplexer select signal. Table 21 gives one embodiment of the possible combinations of the three bits and the resulting output signal on pin SRCH.

TABLE 21

```
000 = search signal SRCH
001 = high resolution data bit signal HRBIT
010 = data bit signal DBIT
011 = cell clock signal CCLK
100 = index signal IDXBIT
101 = servo timing mark STM
110 = enable index signal ENIDXB
111 = enable shift signal ENGRAY
```

When the index enable bit is set, servo timing control circuit 230 generates an index pulse on line INDEX after the next servo sector. The generation of the index pulse resets the index enable bit.

When reset missing STM bit is set, missing STM latch 280 is reset.

DSP 120 sets open search window bit to initiate operation of timing mark sequencer 280 for the initial servo burst acquisition. Burst sequencer 290 resets this bit when a servo timing mark STM is received by generating an active signal on reset search line RST_SRCH. This bit generates a signal on line SRCH independent of the status of servo timing control circuit 230. The active signal on reset search line RST_SRCH from burst sequencer 290 or the setting of reset SRCH bit in decode status register DECSTA register always clears this bit. Writing a zero to this location does not reset this bit.

When the sector timer enable bit is set, sector timer 233 is enabled to run. (See FIG. 19.) When this bit is low, sector timer 233 is held in a reset condition.

Burst branch bit is set by DSP 120 to cause burst sequencer 290 to branch when executing an instruction that includes a branch type field that specifies either a branch bit or a branch bit timed. See Table 4 above.

When the write disable bit is set, write gate control circuit 265 cannot generate qualified write gate signal QWRTGT irrespective of the status of the other input signals to write gate control circuit 265.

When burst sequencer run enable bit is low, instruction decoder 291 in burst sequencer 290 (See FIG. 18.) is held at instruction 00000b and so all output signals from instruction decoder 291 are inactive. This allows the loading of instruction RAM 295 by DSP 120. When burst sequencer run enable bit is set, the instruction at address 00000b executes.

Table 22is one embodiment of decoder status register DECSTA.

TABLE 22

DECODER STATUS REGISTER (DECSTA)

| Bit(s) | rw | Reset | Description |
|---|---|---|---|
| 15 | r | 0 | Missing STM. |
| 14 | rw | 0 | Reserved. |
| 13 | r | 1 | Address Compare. |
| 12 | r | 0 | Decoder Flag. |
| 11 | rw | 0 | Servo Timing Mark Detected. |
| 10 | r | 0 | Index Detected. |
| 09 | r | 0 | INDEX. |
| 08 | r | 0 | DSEC. |
| 07 | r | 0 | SRCH. |
| 06:05 | rw | 0 | Reserved. |
| 04 | rw | 0 | AE Write Error Latch. |
| 03 | rw | 0 | AE Read Error Latch. |
| 02 | rw | 0 | Shock Input Latch. |
| 01 | rw | 0 | EXOR Disable. |
| 00 | w | 0 | Reset SRCH. |

The missing STM bit is set by an active signal on missing STM line MISSING_STM.

The address compare bit is driven active when the masked comparison of gray code shift register 260 to the target register is valid.

The decoder flag bit is set and reset by burst sequencer 290 to save intermediate results or to signal conditions to DSP 120.

The servo timing mark detected bit is set when timing mark sequencer 240 drives servo timing mark signal STM active. Servo timing mark detected bit is reset by writing a one to this bit location.

Index bit detected bit is set in a servo sector that contains an index bit when signal IDXBIT from index bit latch 270 is driven active. This bit is reset by writing a one to a reset index bit in decoder control register DECCTL.

The index, SSEC and SRCH bits indicate the state of index signal INDEX, servo sector signal SSEC, and search signal SRCH, respectively.

The AE write error latch bit is set if the signal level on pin AEERR is not at the same logic level as qualified write gate QWRTGT when qualified write gate QWRTGT is indicating a write. (See latch 1311 in FIG. 13). This bit is reset by writing a one to this location.

The AE read error latch bit is set if the signal level on pin AEERR is not at the same logic level as qualified write gate QWRTGT when qualified write gate QWRTGT is indicating a read. (See latch 1312 in FIG. 13). This bit is reset by writing a one to this location.

Shock input latch bit is set if a shock signal is applied to pin SHKSNS. See shock latch 1308 in FIG. 13. Writing a one to the shock input latch bit resets the bit. When shock input latch bit is set, write gate control circuit 265 disables generation of qualified write gate signal QWRTGT.

When the EXOR bit is set, a low signal is applied on input line from gray code shift register 260 to exclusive OR gate 277. Thus, setting this bit disables the exclusive OR comparison of sequential bits entering gray code shift register 260. In this mode the data bits DBIT are directly shifted in by cell clock CCLK without modification.

When reset SRCH bit is set, search signal SRCH is driven inactive.

Table 23 is one embodiment of drive fault pending register DFLTPD.

TABLE 23

| DRIVE FAULT PENDING REGISTER (DFLTPD) | | | |
|---|---|---|---|
| Bit(s) | rw | Reset | Description |
| 15:7 | r | 0 | Reserved. |
| 6 | rw | 0 | DSP Write Disable, Drive Fault Pending. |
| 5 | rw | 0 | Burst Sequencer Write Disable, Drive Fault Pending. |
| 4 | rw | 0 | Missing STM Write Disable, Drive Fault Pending. |
| 3 | rw | 0 | Address Compare Write Disable, Drive Fault Pending. |
| 2 | rw | 0 | Shock Write Disable, Drive Fault Pending. |
| 1 | rw | 0 | AE Write Error Write Disable, Drive Fault Pending. |
| 0 | rw | 0 | AE Read Error Write Disable, Drive Fault Pending. |

Each of bits 0 to 6 in drive fault pending register DFLTPD are set by signals from write gate control circuit 264 as described above with respect to FIG. 14.

Table 24 is one embodiment of write gate disable drive fault register WRGTDF.

TABLE 24

| WRITE GATE DISABLE DRIVE FAULT REGISTER (WRGTDF) | | | |
|---|---|---|---|
| Bit(s) | rw | Reset | Description |
| 15 | r | 0 | Negative QWRTGT. |
| 14 | rw | 0 | DSP Write Disable, Mask bit. |
| 13 | rw | 0 | Burst Sequencer Write Gate Disable, Mask bit. |
| 12 | rw | 0 | Missing STM Write Gate Disable, Mask bit. |
| 11 | rw | 0 | Address Compare Write Gate Disable, Mask bit. |
| 10 | rw | 0 | Shock Write Gate Disable, Mask bit. |
| 9 | rw | 0 | AE Write Error Write Gate Disable, Mask bit. |
| 8 | rw | 0 | AE Read Error Write Gate Disable, Mask bit. |
| 7 | r | 0 | Negative WRTGT. |
| 6 | rw | 0 | DSP Write Disable, Drive Fault Mask bit. |
| 5 | rw | 0 | Burst Sequencer Write Disable, Drive Fault Mask bit. |
| 4 | rw | 0 | Missing STM Write Disable, Drive Fault Mask bit. |
| 3 | rw | 0 | Address Compare Write Disable, Drive Fault Mask bit. |
| 2 | rw | 0 | Shock Write Disable, Drive Fault Mask bit. |
| 1 | rw | 0 | AE Write Error Write Disable, Drive Fault Mask bit. |
| 0 | rw | 0 | AE Read Error Write Disable, Drive Fault Mask bit. |

The negative qualified write gate bit defines the active state of the signal on line QWRTGT from write gate control circuit 265. When this bit is set the active signal level of the signal on line QWRTGT is active low.

Normally, an active input signal on any one of address compare line ADDCOMP, missing STM line MISSING_STM, shock input line SHKSNS, AE error pin AEERR and write gate disable WRTDIS blocks generation of a qualified write gate on line QWRTGT by write gate control circuit 265. However, mask bits 14 to 8, DSP write gate disable, burst sequencer write gate disable, missing STM write gate disable, address compare write gate, shock write gate disable, disable AE write error, and AE read error write gate disable are each set to prevent blocking of the generation of a qualified write gate by a corresponding active input signal on the line having a corresponding signal. DSP write gate disable bit blocks the effect of the write disable bit in decoder control register DECCTL.

The negative write gate bit defines the active state of the signal on line WRTGT to write gate control circuit 265. When this bit is set the active signal level of the signal on line WRTGT is active low.

Mask bits 6 to 0, DSP write gate disable, burst sequencer write gate disable, missing STM write gate disable, address compare write gate, shock write gate disable, disable AE write error, and AE read error write gate disable are each set to prevent blocking of the generation of a drive fault signal by a corresponding active input signal on the line having a corresponding signal.

This application is related to copending, commonly filed, and commonly assigned (i) U.S. patent application Ser. No. 08/293,981 entitled "A Programmable Servo Burst Decoder," of Nicolas C. Assouad et al. that was filed on Aug. 22, 1994, and (ii) U.S. patent application Ser. No. 08/294,128 entitled "A Programmable Timing Mark Sequencer," of David L. Dyer et al. that was filed on Aug. 22, 1994, which are both incorporated herein by reference in their entirety.

The embodiments described above of the novel programmable servo burst decoder that includes a programmable timing mark sequencer and a programmable servo burst sequencer are illustrative only of the principle of this invention and are intended to limit the invention to the particular embodiments described. For example, the programmable timing mark sequencer could be used independently as could the programmable servo burst sequencer. Both sequencers whether used independently or in combination in another disk drive controller would off load work from the disk drive processor. Similarly, the write gate control circuit and the data synchronizer circuit could be used in other disk controller configurations to achieve a new level in performance.

We claim:

1. In an integrated circuit, a programmable servo burst sequencer comprising:
   a branch control logic circuit having a plurality of input lines;
   an address control logic circuit coupled to said branch control logic circuit, and having an address output bus;
   an instruction memory connected to said address output bus wherein instructions loaded in said instruction memory control operation of said programmable servo burst sequencer;
   an instruction register connected to said instruction memory, and having a plurality of output lines wherein said plurality of output lines includes:
   a branch address bus connected to said address control logic circuit;
   a branch type bus connected to said branch control logic circuit; and
   a count value bus; and a timer circuit connected to said count value bus, and having an output line connected to one of said plurality of input lines to said branch control logic circuit.

2. In an integrated circuit, a programmable servo burst sequencer as in claim 1 wherein said address control logic circuit includes a plurality of sets of input address lines wherein said branch address bus is one set of input address lines in said plurality of sets.

3. In an integrated circuit, a programmable servo burst sequencer as in claim 2 wherein another set of input address lines in said plurality of sets is current address lines wherein said current address lines carry an address of an instruction in said instruction register.

4. In an integrated circuit, a programmable servo burst sequencer as in claim 2 wherein another set of input address lines in said plurality of sets is current address plus one lines wherein said current address plus one lines carry an address that is an address of an instruction in said instruction register plus one.

5. In an integrated circuit, a programmable servo burst sequencer as in claim 1 wherein one of said plurality of branch control logic circuit input lines comprises a servo timing mark input line.

6. In an integrated circuit, a programmable servo burst sequencer as in claim 1 wherein one of said plurality of branch control logic circuit input lines comprises a missing servo timing mark input line.

7. In an integrated circuit, a programmable servo burst sequencer as in claim 1 wherein one of said plurality of branch control logic circuit input lines comprises a search input line.

8. In an integrated circuit, a programmable servo burst sequencer as in claim 1 wherein said instruction memory comprises instruction random access memory (RAM).

9. In an integrated circuit, a programmable servo burst sequencer as in claim 1 wherein said instruction register has thirty-eight bits.

10. In an integrated circuit, a programmable servo burst sequencer as in claim 1 wherein said instruction memory is 32 instructions deep.

11. In an integrated circuit, a programmable servo burst sequencer comprising:
    a servo timing mark input line;
    a search input line;
    a missing servo timing mark input line;
    an address generation circuit connected to said servo timing mark input line, said search input line, and said missing servo timing mark input line, and having an address output bus;
    a memory connected to said address output bus; and
    an instruction register connected to said memory and having a plurality of output lines wherein a set of said lines in said plurality of output lines of said instruction register are connected to said address generation circuit.

12. In an integrated circuit, a programmable servo burst sequencer as in claim 11 wherein said address generation circuit further comprises a branch logic circuit and an address control circuit.

* * * * *